(12) United States Patent
Wang et al.

(10) Patent No.: US 9,557,879 B1
(45) Date of Patent: *Jan. 31, 2017

(54) SYSTEM FOR INFERRING DEPENDENCIES AMONG COMPUTING SYSTEMS

(71) Applicant: Quest Software, Inc., Aliso Viejo, CA (US)

(72) Inventors: Xiangrui Wang, Burlington (CA); Joseph Vaughn Rustad, Toronto (CA); Gia Duong Diep, Toronto (CA)

(73) Assignee: Dell Software Inc., Aliso Viejo, CA (US)

( * ) Notice: Subject to any disclaimer, the term of this patent is extended or adjusted under 35 U.S.C. 154(b) by 620 days.

This patent is subject to a terminal disclaimer.

(21) Appl. No.: 13/658,709

(22) Filed: Oct. 23, 2012

(51) Int. Cl.
*G06F 3/0481* (2013.01)
*G06F 3/0482* (2013.01)

(52) U.S. Cl.
CPC .................................. *G06F 3/0481* (2013.01)

(58) Field of Classification Search
CPC ...... H04L 41/22; H04L 41/12; H04L 12/2602; H04L 41/145; G06F 3/0481; G06F 4/0482; G06F 9/4443; G06F 17/5022
USPC ............................................ 703/21; 715/853
See application file for complete search history.

(56) References Cited

U.S. PATENT DOCUMENTS

| | | |
|---|---|---|
| 3,701,971 A | 10/1972 | Sanner et al. |
| 3,839,707 A | 10/1974 | Woodward et al. |
| 4,468,728 A | 8/1984 | Wang |
| 4,683,532 A | 7/1987 | Yount et al. |
| 4,937,740 A | 6/1990 | Agarwal et al. |
| 5,103,394 A | 4/1992 | Blasciak |
| 5,321,838 A | 6/1994 | Hensley et al. |
| 5,375,199 A | 12/1994 | Harrow et al. |
| 5,432,932 A | 7/1995 | Chen et al. |
| 5,450,586 A | 9/1995 | Kuzara et al. |
| 5,493,658 A | 2/1996 | Chiang et al. |
| 5,506,955 A | 4/1996 | Chen et al. |
| 5,517,629 A | 5/1996 | Boland |
| 5,528,753 A | 6/1996 | Fortin |

(Continued)

FOREIGN PATENT DOCUMENTS

WO WO-2013162596 A1 10/2013

OTHER PUBLICATIONS

Foglight 5.6.4 Managing Dependency Mapping User Guide, Quest Software, Inc., pp. 1-62 (2012).

(Continued)

*Primary Examiner* — Thai Phan
*Assistant Examiner* — Shiuh-Huei Ku
(74) *Attorney, Agent, or Firm* — Winstead PC

(57) ABSTRACT

Systems and methods are described for identifying, tracking, and customizing dependencies between components of a computing environment. By providing greater insight and transparency into dependencies, the systems and methods can facilitate modeling the underlying architecture of applications and computer hardware. As a result, IT personnel can better track relationships between components. Custom filtering tools can also provide IT personnel with tools to switch from different types of dependency views that focus on application-oriented views, hardware-oriented views, or other custom views. Model annotation tools can also enable IT personnel to customize a dependency model to reflect real-world application and hardware monitoring conditions.

24 Claims, 15 Drawing Sheets

(56) References Cited

U.S. PATENT DOCUMENTS

| | | |
|---|---|---|
| 5,539,907 A | 7/1996 | Srivastava et al. |
| 5,572,640 A | 11/1996 | Schettler |
| 5,600,789 A | 2/1997 | Parker et al. |
| 5,623,598 A | 4/1997 | Voigt et al. |
| 5,649,187 A | 7/1997 | Hornbuckle |
| 5,671,351 A | 9/1997 | Wild et al. |
| 5,673,386 A | 9/1997 | Batra |
| 5,684,945 A | 11/1997 | Chen et al. |
| 5,701,137 A | 12/1997 | Kiernan et al. |
| 5,708,775 A | 1/1998 | Nakamura |
| 5,715,388 A | 2/1998 | Tsuchihashi |
| 5,715,415 A | 2/1998 | Dazey et al. |
| 5,720,018 A | 2/1998 | Muller et al. |
| 5,740,357 A | 4/1998 | Gardiner et al. |
| 5,748,881 A | 5/1998 | Lewis et al. |
| 5,752,062 A | 5/1998 | Gover et al. |
| 5,768,501 A | 6/1998 | Lewis |
| 5,872,909 A | 2/1999 | Wilner et al. |
| 5,881,306 A | 3/1999 | Levine et al. |
| 5,903,453 A | 5/1999 | Stoddard, II |
| 5,903,898 A | 5/1999 | Cohen et al. |
| 5,911,048 A | 6/1999 | Graf |
| 5,960,425 A | 9/1999 | Buneman et al. |
| 5,978,594 A | 11/1999 | Bonnell et al. |
| 5,983,366 A | 11/1999 | King |
| 6,018,567 A | 1/2000 | Dulman |
| 6,029,170 A | 2/2000 | Garger et al. |
| 6,035,412 A | 3/2000 | Tamer et al. |
| 6,128,016 A | 10/2000 | Coelho et al. |
| 6,148,335 A | 11/2000 | Haggard et al. |
| 6,173,322 B1 | 1/2001 | Hu |
| 6,195,092 B1 | 2/2001 | Dhond et al. |
| 6,199,199 B1 | 3/2001 | Johnston et al. |
| 6,223,171 B1 | 4/2001 | Chaudhuri et al. |
| 6,243,105 B1 | 6/2001 | Hoyer et al. |
| 6,330,008 B1 | 12/2001 | Razdow et al. |
| 6,351,754 B1 | 2/2002 | Bridge et al. |
| 6,381,628 B1 | 4/2002 | Hunt |
| 6,473,791 B1 | 10/2002 | Al-Ghosein et al. |
| 6,538,669 B1 | 3/2003 | Lagueux, Jr. et al. |
| 6,543,006 B1 | 4/2003 | Zundel et al. |
| 6,594,655 B2 | 7/2003 | Tal et al. |
| 6,622,221 B1 | 9/2003 | Zahavi |
| RE38,270 E | 10/2003 | Nakajima |
| 6,654,830 B1 | 11/2003 | Taylor et al. |
| 6,751,555 B2 | 6/2004 | Poedjono |
| 6,771,646 B1 | 8/2004 | Sarkissian et al. |
| 6,833,787 B1 | 12/2004 | Levi |
| 6,847,970 B2 | 1/2005 | Keller et al. |
| 6,901,582 B1 | 5/2005 | Harrison |
| 6,993,454 B1 | 1/2006 | Murstein et al. |
| 7,010,588 B2 | 3/2006 | Martin et al. |
| 7,103,843 B2 | 9/2006 | Hand et al. |
| 7,127,324 B2 | 10/2006 | Batori et al. |
| 7,274,375 B1 | 9/2007 | David |
| 7,363,211 B1 | 4/2008 | Naganathan et al. |
| 7,389,345 B1 | 6/2008 | Adams |
| 7,436,822 B2 | 10/2008 | Lee et al. |
| 7,480,647 B1 | 1/2009 | Murstein et al. |
| 7,480,866 B2 | 1/2009 | Germain et al. |
| 7,483,978 B2 | 1/2009 | Esfahany et al. |
| 7,512,888 B2 | 3/2009 | Sugino et al. |
| 7,523,128 B1 | 4/2009 | Miller et al. |
| 7,532,642 B1 | 5/2009 | Peacock |
| 7,557,803 B2 | 7/2009 | Furukawa et al. |
| 7,558,790 B1 | 7/2009 | Miller et al. |
| 7,565,610 B2 | 7/2009 | Li et al. |
| 7,587,492 B2 | 9/2009 | Dyck et al. |
| 7,620,984 B2 | 11/2009 | Kallahalla et al. |
| 7,644,397 B2 | 1/2010 | Warren et al. |
| 7,685,251 B2 | 3/2010 | Houlihan et al. |
| 7,698,683 B1 | 4/2010 | Miller et al. |
| 7,784,027 B2 | 8/2010 | Harrison |
| 7,792,941 B2 | 9/2010 | Fried et al. |
| 7,822,837 B1 | 10/2010 | Urban et al. |
| 7,882,216 B2 | 2/2011 | Houlihan et al. |
| 7,917,617 B1 | 3/2011 | Ponnapur et al. |
| 7,962,590 B1 | 6/2011 | Or et al. |
| 7,979,245 B1 | 7/2011 | Bourlatchkov et al. |
| 8,051,162 B2 | 11/2011 | Arlitt et al. |
| 8,051,330 B2 | 11/2011 | Cinato et al. |
| 8,051,382 B2 | 11/2011 | Kingdom et al. |
| 8,103,638 B2 | 1/2012 | Voznika et al. |
| 8,103,826 B2 | 1/2012 | Kobayashi |
| 8,112,366 B2 | 2/2012 | Hollingsworth et al. |
| 8,155,996 B1 | 4/2012 | Cassone et al. |
| 8,161,058 B2 | 4/2012 | Agarwal et al. |
| 8,175,862 B1 | 5/2012 | Bourlatchkov et al. |
| 8,175,863 B1 | 5/2012 | Ostermeyer et al. |
| 8,181,154 B2 | 5/2012 | Harrison |
| 8,185,598 B1 | 5/2012 | Golovin et al. |
| 8,203,972 B2 | 6/2012 | Sauermann |
| 8,217,945 B1 | 7/2012 | Moscovici |
| 8,239,526 B2 | 8/2012 | Simpson et al. |
| 8,255,516 B1 | 8/2012 | Zhang et al. |
| 8,347,273 B2 | 1/2013 | Nageshappa et al. |
| 8,364,460 B2 | 1/2013 | Ostermeyer et al. |
| 8,423,646 B2 | 4/2013 | Jamjoom et al. |
| 8,490,055 B2 | 7/2013 | Basak |
| 8,555,244 B2 | 10/2013 | Harrison |
| 8,635,498 B2 | 1/2014 | Kahana et al. |
| 8,819,673 B1 | 8/2014 | Wilkinson et al. |
| 8,880,678 B1 | 11/2014 | Colton et al. |
| 8,892,415 B2 | 11/2014 | Bourlatchkov et al. |
| 8,902,248 B1 | 12/2014 | Bidarkar et al. |
| 8,930,395 B2 | 1/2015 | Sharma et al. |
| 9,075,911 B2 | 7/2015 | Mohan et al. |
| 9,274,758 B1 | 3/2016 | Qin et al. |
| 2001/0018710 A1 | 8/2001 | Clarke et al. |
| 2002/0138659 A1 | 9/2002 | Trabaris et al. |
| 2002/0175941 A1 | 11/2002 | Hand et al. |
| 2003/0009551 A1 | 1/2003 | Benfield et al. |
| 2003/0028630 A1 | 2/2003 | Bischof et al. |
| 2003/0084155 A1 | 5/2003 | Graupner et al. |
| 2003/0097438 A1* | 5/2003 | Bearden .............. H04L 12/2697 709/224 |
| 2003/0101262 A1 | 5/2003 | Godwin |
| 2003/0126256 A1 | 7/2003 | Cruickshank et al. |
| 2003/0149753 A1 | 8/2003 | Lamb |
| 2003/0204588 A1 | 10/2003 | Peebles et al. |
| 2003/0225563 A1 | 12/2003 | Gonos |
| 2004/0006763 A1 | 1/2004 | Van De Vanter et al. |
| 2004/0012637 A1 | 1/2004 | Alford, Jr. et al. |
| 2004/0030592 A1 | 2/2004 | Buck et al. |
| 2004/0039728 A1* | 2/2004 | Fenlon et al. .................... 707/1 |
| 2004/0046785 A1* | 3/2004 | Keller ................... G06F 9/5061 715/734 |
| 2004/0059812 A1 | 3/2004 | Assa |
| 2004/0064293 A1 | 4/2004 | Hamilton et al. |
| 2004/0068560 A1 | 4/2004 | Oulu et al. |
| 2004/0102925 A1 | 5/2004 | Giffords |
| 2005/0021743 A1 | 1/2005 | Fleig et al. |
| 2005/0021748 A1 | 1/2005 | Garcea et al. |
| 2005/0111352 A1 | 5/2005 | Ho et al. |
| 2005/0187750 A1 | 8/2005 | Satoh et al. |
| 2005/0198649 A1 | 9/2005 | Zakonov |
| 2005/0232227 A1 | 10/2005 | Jorgenson et al. |
| 2006/0002478 A1 | 1/2006 | Seo |
| 2006/0101340 A1 | 5/2006 | Sridhar et al. |
| 2006/0168199 A1 | 7/2006 | Chagoly et al. |
| 2006/0171334 A1 | 8/2006 | Hirata et al. |
| 2006/0173875 A1 | 8/2006 | Stefaniak |
| 2007/0008884 A1 | 1/2007 | Tang |
| 2007/0028239 A1 | 2/2007 | Dyck et al. |
| 2007/0043860 A1 | 2/2007 | Pabari |
| 2007/0087756 A1 | 4/2007 | Hoffberg |
| 2007/0226341 A1 | 9/2007 | Mateo |
| 2007/0250525 A1 | 10/2007 | Sanghvi et al. |
| 2007/0255814 A1 | 11/2007 | Green et al. |
| 2008/0016115 A1* | 1/2008 | Bahl ..................... H04L 41/22 |
| 2008/0077366 A1 | 3/2008 | Neuse et al. |
| 2008/0155537 A1 | 6/2008 | Dinda et al. |
| 2008/0162107 A1 | 7/2008 | Aniszczyk et al. |
| 2008/0222633 A1 | 9/2008 | Kami |

(56) References Cited

U.S. PATENT DOCUMENTS

| | | |
|---|---|---|
| 2008/0263073 A1 | 10/2008 | Ohba et al. |
| 2008/0306711 A1 | 12/2008 | Bansal |
| 2008/0320269 A1 | 12/2008 | Houlihan et al. |
| 2009/0013281 A1* | 1/2009 | Helfman ........... G06F 17/30572 715/788 |
| 2009/0083276 A1 | 3/2009 | Barsness et al. |
| 2009/0119301 A1 | 5/2009 | Cherkasova et al. |
| 2009/0147011 A1 | 6/2009 | Buck et al. |
| 2009/0150538 A1 | 6/2009 | Tripathi et al. |
| 2009/0164250 A1 | 6/2009 | Hamilton et al. |
| 2009/0172666 A1 | 7/2009 | Yahalom et al. |
| 2009/0177567 A1 | 7/2009 | McKerlich et al. |
| 2009/0199177 A1 | 8/2009 | Edwards et al. |
| 2009/0204718 A1 | 8/2009 | Lawton et al. |
| 2009/0210527 A1 | 8/2009 | Kawato |
| 2009/0222558 A1 | 9/2009 | Xu et al. |
| 2009/0241108 A1 | 9/2009 | Edwards et al. |
| 2009/0271646 A1 | 10/2009 | Talwar et al. |
| 2009/0300605 A1 | 12/2009 | Edwards et al. |
| 2010/0015926 A1 | 1/2010 | Luff |
| 2010/0114554 A1 | 5/2010 | Misra |
| 2010/0125665 A1 | 5/2010 | Simpson et al. |
| 2010/0190509 A1 | 7/2010 | Davis |
| 2010/0223609 A1* | 9/2010 | DeHaan et al. ............. 717/177 |
| 2010/0229096 A1 | 9/2010 | Maiocco et al. |
| 2010/0241690 A1 | 9/2010 | Kurapati et al. |
| 2010/0315958 A1 | 12/2010 | Luo et al. |
| 2010/0317420 A1 | 12/2010 | Hoffberg |
| 2010/0325273 A1 | 12/2010 | Kudo |
| 2011/0047496 A1 | 2/2011 | Harrison |
| 2011/0066780 A1 | 3/2011 | Bruce et al. |
| 2011/0119748 A1 | 5/2011 | Edwards et al. |
| 2011/0125800 A1 | 5/2011 | Seager et al. |
| 2011/0145380 A1 | 6/2011 | Glikson et al. |
| 2011/0153724 A1 | 6/2011 | Raja et al. |
| 2011/0161851 A1 | 6/2011 | Barber et al. |
| 2011/0209146 A1 | 8/2011 | Box et al. |
| 2011/0254704 A1 | 10/2011 | Fournier et al. |
| 2011/0270566 A1 | 11/2011 | Sawada et al. |
| 2011/0302577 A1 | 12/2011 | Reuther et al. |
| 2012/0005148 A1 | 1/2012 | Horvitz et al. |
| 2012/0011254 A1 | 1/2012 | Jamjoom et al. |
| 2012/0023429 A1 | 1/2012 | Medhi |
| 2012/0030346 A1 | 2/2012 | Fukuda et al. |
| 2012/0166623 A1 | 6/2012 | Suit |
| 2012/0198073 A1 | 8/2012 | Srikanth et al. |
| 2012/0221314 A1 | 8/2012 | Bourlatchkov et al. |
| 2012/0222002 A1 | 8/2012 | Harrison |
| 2012/0254900 A1 | 10/2012 | Kumar et al. |
| 2012/0271821 A1 | 10/2012 | Qin et al. |
| 2012/0284713 A1 | 11/2012 | Ostermeyer et al. |
| 2013/0066823 A1 | 3/2013 | Sweeney et al. |
| 2013/0159999 A1 | 6/2013 | Chiueh et al. |
| 2013/0174127 A1 | 7/2013 | Chen et al. |
| 2013/0211905 A1 | 8/2013 | Qin et al. |
| 2013/0212285 A1 | 8/2013 | Hoffmann et al. |
| 2013/0218547 A1 | 8/2013 | Ostermeyer et al. |
| 2014/0006580 A1 | 1/2014 | Raghu |
| 2014/0013315 A1 | 1/2014 | Genevski et al. |
| 2014/0052712 A1 | 2/2014 | Savage et al. |
| 2014/0079297 A1 | 3/2014 | Tadayon et al. |
| 2014/0089901 A1 | 3/2014 | Hadar |
| 2014/0092722 A1 | 4/2014 | Jain et al. |
| 2014/0115164 A1 | 4/2014 | Kalyanaraman et al. |
| 2014/0165063 A1 | 6/2014 | Shiva et al. |
| 2014/0258872 A1 | 9/2014 | Spracklen et al. |
| 2014/0269691 A1 | 9/2014 | Xue et al. |
| 2014/0304407 A1 | 10/2014 | Moon |
| 2014/0310813 A1 | 10/2014 | Murthy |
| 2014/0317261 A1 | 10/2014 | Shatzkamer et al. |
| 2014/0317293 A1 | 10/2014 | Shatzkamer |
| 2014/0350888 A1 | 11/2014 | Gesmann |
| 2014/0372230 A1 | 12/2014 | Ray et al. |
| 2015/0032437 A1 | 1/2015 | Kumar et al. |
| 2015/0046212 A1 | 2/2015 | Mos |
| 2015/0052250 A1 | 2/2015 | Doganata et al. |
| 2015/0127415 A1 | 5/2015 | Showalter et al. |
| 2015/0134589 A1 | 5/2015 | Marrelli et al. |
| 2015/0142457 A1 | 5/2015 | Marshall |
| 2015/0358391 A1 | 12/2015 | Moon et al. |
| 2016/0042296 A1 | 2/2016 | Shan et al. |

OTHER PUBLICATIONS

Foglight 5.6.2 Managing Dependency Mapping User Guide, Quest Software, Inc., pp. 1-55 (2011).
Foglight APM: An Adaptive Architecture for all Environments, Quest Software, Inc., pp. 1-25 (2011).
vFoglight Alarms Overview—Demo 6, pp. 1-31 (2009).
Foglight 5.5.8 Managing Dependency Mapping User Guide, Quest Software, Inc., pp. 1-53 (2011).
Cappelli, APM Needs Three-Layered Application Models, Gartner Research, pp. 1-5 (Feb. 26, 2010).
"Instance Monitor the Real-Time Database Monitoring and Diagnostic Solution for Oracle," Brochure, Quest Software, Inc. 1999, 2 pages.
Boucher et al., Essential Guide to Object Monitors, Mar. 1999, whole book.
Dewan, et al. "A High-Level and Flexible Framework for Implementing Multiuser User Interfaces", 1992, ACM, p. 345-380.
Distributed Management Task Force, Inc., "Common Information Model (CIM) Infrastructure Specification"; Version 2.3 Final; Oct. 4, 2005; 102 pages.
Harrison, Guy, "Building a High-Performance Oracle Database Server," and "Tuning the Database Server," in: "Oracle SQL High-Performance Tuning," (New Jersey. Prentice-Hall, 1997), pp. 363-364, 399-400.
Hitachi TP Broker User's Guide, Release 3.1, 1998, entire manual.
Laessig; "Score Big with JSR 77, the J2EE Management Specification", Javaworld; Jun. 14, 2002; 8 pages.
Muller, Focus on HP OpenView: A Guide to Hewlett Packard's Network Management Platform, 1995, entire book.
Savant Corporation, "Products," http://www.savant-corp.com/prods.html, 1 page downloaded from the World Wide Web on Nov. 16, 1999.
Savant Corporation, "Products," http://www.savant-corp.com/prods.html, 1 page, downloaded and printed from the World Wide Web on Feb. 15, 2000.
Savant Corporation, "Q Application Diagnostics," http:///savant-corp.com/qappd.html, 1 page, downloaded and printed from the World Wide Web on Nov. 16, 1999.
Savant Corporation, "Q Hot SQL," http:///www.savant-corp.com/qhsql.html, 1 page, downloaded and printed from the World Wide Web on Nov. 16, 1999.
Savant Corporation, "Q Instance Overview," http:///www.savant-corp.com/qiov.html, 1 page, downloaded and printed from the World Wide Web on Nov. 16, 1999.
Savant Corporation, "Q Job Queue Manager," http:///www.savant-corp.com/qjobq.html, 1 page, downloaded and printed from the World Wide Web on Nov. 16, 1999.
Savant Corporation, "Q Lock Manager," http:///www.savant-corp.com/qlock.html, 1 page, downloaded and printed from the World Wide Web on Nov. 16, 1999.
Savant Corporation, "Q Replay Viewer," http:///www.savant-corp.com/qreplay.html, 1 page downloaded and printed from the World Wide Web on Nov. 16, 1999.
Singh et al; "Designing Web Services with the JDEE™ 1.4 Platform," Chapter 6 (pp. 247-289), May 2004; 46 total pages.
Tang, et al. "Blending Structured Graphics and Layout", 1994, ACM, p. 167-174.
What is a System Center Advisor?, http://onlinehelp.microsoft.com/en-us/advisor/ff962512(printer).aspx, accessed on Apr. 5, 2011.
Microsoft System Center Advisor page, https://www.systemcenteradvisor.com/, accessed on Apr. 4, 2011.
Windows Management Instrumentation: Frequently Asked Questions, Troubleshooting and Tips, http://technet.microsoft.com/en-us/library/ee692772(d=printer).aspx, Microsoft TechNet, published Jul. 28, 2004, updated Sep. 10, 2004, pp. 1-20.

(56) References Cited

OTHER PUBLICATIONS

Maston, Managing Windows with WMI, Microsoft TechNet, Published Nov. 1, 1999, pp. 1-11.
BMC Software, Inc.; "BMC Atrium Discovery and Dependency Mapping"; http://documents.bmc.com/products/documents/18/60/451860/451860.pdf ; 2014; 2 pages.
Grisby, Duncan; "The Power behind BMC Atrium Discovery and Dependency Mapping"; http://documents.bmc.com/products/documents/18/97/451897/451897.pdf; 2014; 5 pages.
Hewlett-Packard Development Company, L.P.; "Data Sheet: HP Universal Discovery Software"; http://h20195.www2.hp.com/V2/GetPDF.aspx/4AA4-1812ENW.pdf; Sep. 2014; 8 pages.
U.S. Appl. No. 14/562,474, Rustad et al.
U.S. Appl. No. 14/249,147, Rustad et al.
U.S. Appl. No. 14/292,135, Rustad.
U.S. Appl. No. 14/619,897, Diep et al.
U.S. Appl. No. 14/858,341, Qin et al.
Layered Technologies, Inc., "Optimized Application Performance and User Experience: Application Performance Management Service," 2013, 4 pages.
Levey, Tom, "Monitoring the Real End User Experience," www.appdynamics.com, Jul. 25, 2013, 7 pages.
Quarles, John et al.; "A Mixed Reality Approach for Merging Abstract and Concrete Knowledge"; IEEE Virtual Reality 2008; Mar. 8-12, 2008; pp. 27-34.
Aternity, Inc., "Aternity Virtual Desktop Monitoring: Get Visibility into all Tiers of the Virtual Desktop," http://www.aternity.com/products/workforce-apm/virtual-desktop-monitoring/, May 11, 2014, 2 pages.
Solarwinds Worldwide. LLC., "SolarWinds: Virtualization Manager Administrator Guide," DocVersion 6.3.0.1, Sep. 8, 2015, 321 pages.
EG Innovations, Inc., "eG Enterprise Performance Monitoring for Citrix XenDesktop: Performance Assurance for Citrix Virtual Desktops," www.eginnovations.com, accessed on Sep. 17, 2015, 2 pages.
EG Innovations, Inc., "Service Overview: VDI Performance Assessment: Move VDI Deployments from Test to Best," www.eginnovations.com, accessed on Sep. 17, 2015, 2 pages.
EG Innovations, Inc., "Total Performance Monitoring for Citrix XenApp and XenDesktop," www.eginnovations.com, accessed on Sep. 17, 2015, 2 pages.
Goliath Technologies, "Goliath Performance Monitor: for Citrix XenApp & XenDesktop," http://goliathtechnologies.com, May 2014, 2 pages.
Goliath Technologies, "Goliath Performance Monitor: for VMware," http://goliathtechnologies.com, May 2014, 2 pages.
VMTURBO, "VDI Control Module," http://vmturbo.com, Nov. 2014, 2 pages.
VMTURBO, "VMTurbo Operations Manager: Demand-Driven Control for Cloud and Virtualization," http://vmturbo.com, Jun. 2015, 2 pages.
U.S. Appl. No. 13/745,677, Ostermeyer.
U.S. Appl. No. 14/725,778, Chen et al.
U.S. Appl. No. 14/607,776, Qin et al.
U.S. Appl. No. 14/607,907, Qin et al.
Wikimedia Foundation, Inc.; "Network Functions Virtualization"; http://en.wikipedia.org/wiki/Network_Functions_Virtualization; last modified Mar. 17, 2015; 6 pages.
NEO4J; "Network Dependency Graph"; http://www.neo4j.org/graphgist?github-neo4J . . . ; Jun. 18, 2014; 9 pages.
Template Software, Workflow Template Process Template, "Developing a WFT Workflow System", 1997, whole manual.
Partridge C. et al. FIRE State Message Protocol Specification, BBN Technologies, Jul. 12, 2000, (pp. 1-19).
NEWRELICBLOG, "Platform as a Service Meets SaaS Application Performance Management"; http://blog.newrelic.com/2011/01/13/platform-as-a-service-meets-saas-application-performance-management/; Jan. 13, 2011; 3 pages.
Grisby, Duncan; "The Power behind BMC Atrium Discovery and Dependency Mapping"; http://documents.bmc.com/products/documents/18/97/451897.pdf; 2014; 5 pages.
U.S. Appl. No. 13/658,724, Wang et al.
U.S. Appl. No. 15/201,655, Qin et al.
U.S. Appl. No. 15/201,657, Qin et al.
Wood, Timothy, et al.; Middleware 2008; "Profiling and Modeling Resource Usage of Virtualized Applications"; vol. 5346 of the series Lecture Notes in Computer Science; Dec. 2008; pp. 366-387.
Liquidware Labs; "Performance Validation and Optimization"; http://www.liquidwarelabs.com/products/stratusphere-ux/performance-validation-optimization; Oct. 1, 2015; 2 pages.
Dell, Inc.; "Monitoring with User Dashboards"; vWorkspace Monitoring and Diagnostics 5.5.5—User's Guide; http://documents.software.dell.com/vworkspace-monitoring-and-diagnostics/5.6.5/users-guide/users-guide/working-with-foglight-for-virtual-desktops/monitoring-with-user-dashboards?ParentProduct=687; last revised on May 23, 2013; 4 pages.
Agrawal, Banit, et al.; "VMware View® Planner: Measuring True Virtual Desktop Experience at Scale"; VMWare Technical Journal (VMTJ), Winter 2012; Dec. 2012; pp. 69-79.
Spracklen, Lawrence, et al.; "Comprehensive User Experience Monitoring"; VMWare Technical Journal (VMTJ), Spring 2012; Mar. 2012; pp. 22-31.

* cited by examiner

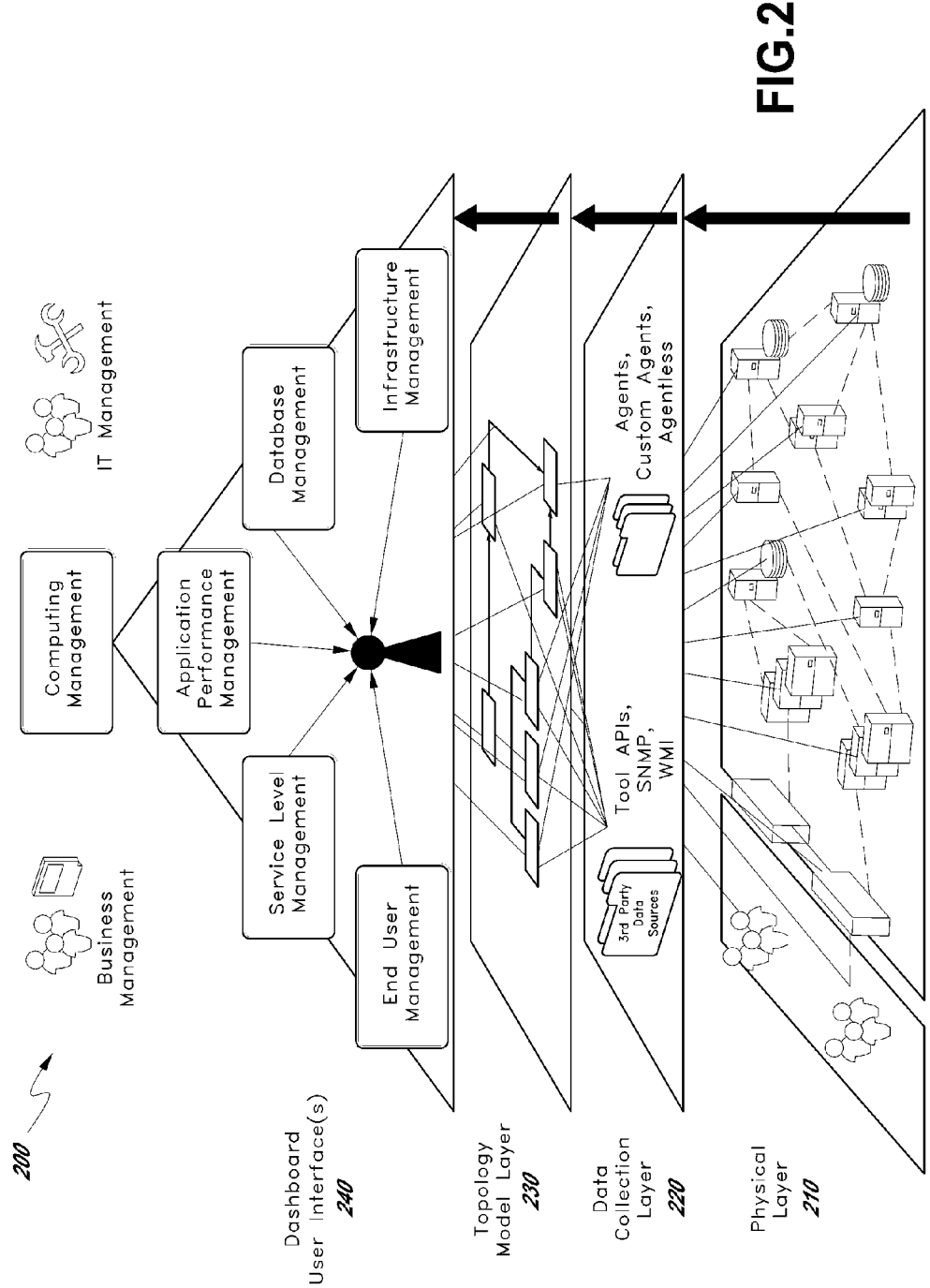

SYSTEM FOR INFERRING DEPENDENCIES AMONG COMPUTING SYSTEMS

BACKGROUND

Information technology specialists, or system administrators, are responsible for maintaining, managing, protecting and configuring computer systems and their resources. More and more, such maintenance includes ensuring multiple users local and remote access to vast resources of data over a great number of computer applications and systems, including the Internet. Moreover, system administrators are asked to provide access to these highly reliable systems at practically any time of day while ensuring the system's integrity is not threatened by dataflow bottlenecks or excessive overhead.

In addition, many companies now take advantage of virtualization solutions to consolidate several specialized physical servers and workstations into fewer servers running virtual machines. Understanding the performance of a virtual infrastructure, however, is a complex challenge. Performance issues with virtual machines can be based on a variety of factors, including what is occurring within the virtual machine itself, problems with the underlying platform, problems caused by consumption of resource(s) by other virtual servers running on the same underlying platform, and/or problems of priority and allocation of resource(s) to the virtual machine(s). When seeking to ensure performance and maximize uptime, administrators often struggle to understand and monitor the virtual infrastructure, and also to quickly diagnose and resolve problems.

SUMMARY

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

In certain embodiments, a method of providing information about dependencies in a computing environment to a user includes receiving monitoring data obtained from a plurality of monitored resources in a computing environment. The method can further include transforming the monitoring data into a topology model having a plurality of interconnected topology objects. The topology objects can represent the monitored resources. In addition, interconnections between the topology objects can reflect existing relationships between the plurality of monitored resources in the computing environment. The method may also include tracking first dependencies between first ones of the topology objects based at least in part on observed interactions between the first topology objects. The observed interactions between the first topology objects can be at least partially different from the existing relationships represented in the topology model. The method may also include inferring second dependencies between second ones of the topology objects based at least in part on the observed interactions between the first topology objects and the interconnections between the topology objects represented in the topology model. Moreover, the method may include storing data representing the first and second dependencies in a dependency graph, as well as providing a registry user interface configured to enable users to annotate the dependency graph to adjust the first and second dependencies represented in the dependency graph to thereby produce a modified dependency graph. Furthermore, the method can include applying, with a computer system comprising computer hardware, one or more custom filters to the modified dependency graph to select a custom view of the second dependencies in the modified dependency graph for display, and outputting the custom view of the second dependencies for presentation to a user.

Various embodiments of a system for providing information about dependencies in a computing environment to a user can include a topology engine that can transform monitoring data received from a plurality of computing devices into a topology model comprising a plurality of interconnected topology objects, such that interconnections between the topology objects reflect existing relationships between the plurality of computing devices; a dependency detector configured to build a dependency graph by inferring dependencies between first ones of the topology objects based at least in part on observed interactions between second ones of the topology objects and the interconnections between the topology objects represented in the topology model. The method can also include a custom filter module including computer hardware. The custom filter module can provide functionality for defining a custom filter for filtering the dependency graph and to apply, in response to a user request to view dependencies, the custom filter to the dependency graph to select a subset of the dependencies in the dependency graph and provide the subset of dependencies as an output.

Non-transitory physical computer storage can also be provided that has instructions stored thereon that, when executed by one or more processors, implement components for providing information about dependencies in a computing environment to a user. The components can include a dependency detector that can build a dependency graph from dependencies detected between computing devices in a computing environment, a registry module that can provide functionality that enables users to modify the dependency graph to adjust the dependencies represented in the dependency graph to thereby produce a modified dependency graph, and a plurality of custom filters that can filter the modified dependency graph to select a subset of the dependencies in the modified dependency graph and provide the subset of dependencies as an output.

Further, in some embodiments, a method of providing information about dependencies in a computing environment to a user can include receiving monitoring data obtained from a plurality of monitored resources in a computing environment and transforming the monitoring data into a topology model having a plurality of interconnected topology objects. The topology objects can represent the monitored resources, where interconnections between the topology objects can reflect existing relationships between the plurality of monitored resources in the computing environment. The method may also include tracking first dependencies between first ones of the topology objects based at least in part on observed interactions between the first topology objects. The observed interactions between the first topology objects may be at least partially different from the existing relationships represented in the topology model. The method may also include inferring second dependencies between second ones of the topology objects based at least in part on the observed interactions between the first topology objects and the interconnections between the topology objects represented in the topology model. The method may further include storing data representing the first and second dependencies in a dependency graph and outputting, with a computer system including computer hardware, a registry user interface that can enable users to annotate the dependency graph to adjust one or both of the first and second dependencies represented in the dependency graph to thereby produce a modified dependency graph. Further, the method may include outputting a portion of the modified dependency graph for presentation to a user.

In many embodiments, a system for providing information about dependencies in a computing environment to a user includes a topology engine that can transform monitoring data received from a plurality of computing devices into a topology model having a plurality of interconnected topology objects, such that interconnections between the topology objects can reflect existing relationships between the plurality of computing devices. The system may also include a dependency detector that can build a dependency graph by inferring dependencies between first ones of the topology objects based at least in part on observed interactions between second ones of the topology objects and the interconnections between the topology objects represented in the topology model. The system may also include a registry module including computer hardware. The registry module can provide functionality that enables users to modify the dependency graph to adjust the dependencies represented in the dependency graph to thereby produce a modified dependency graph.

Non-transitory physical computer storage can also be provided that includes instructions stored thereon that, when executed by one or more processors, implement components for providing information about dependencies in a computing environment to a user. The components can include a topology engine that can transform monitoring data received from a plurality of computing devices into a topology model having a plurality of interconnected topology objects, such that interconnections between the topology objects reflect existing relationships between the plurality of computing devices. The components can also include a dependency detector that can build a dependency graph from dependencies detected between the computing devices as represented by dependencies between the topology objects. Further, the components can include a registry module that can provide functionality that enables users to modify the dependency graph to adjust the dependencies represented in the dependency graph to thereby produce a modified dependency graph.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

FIG. 2 illustrates an example computing management architecture that can be implemented by the computing management system of FIG. 1.

DETAILED DESCRIPTION

I. Introduction

Information Technology (IT) professionals often struggle to understand what infrastructure and application components actually support a given application. While the general architecture of a computing environment is rarely a complete mystery, it is equally rare that IT professionals have the full details at their fingertips. Most often, information about interactions between computing systems is out of date or incomplete, stored in a combination of spreadsheets, Microsoft Visio™ diagrams, and configuration management databases. Performance monitoring and troubleshooting can improve if an easier way to track and model the underlying architecture of applications were to be found.

This disclosure describes embodiments of systems and methods for identifying, tracking, and customizing dependencies between components of a computing environment. By providing greater insight and transparency into dependencies, the systems and methods can facilitate modeling the underlying architecture of applications and computer hardware. As a result, IT personnel can better track relationships between components. Custom dependency tracking features described herein can also provide IT personnel with tools to switch from different types of dependency views that focus on application-oriented views, hardware-oriented views, or other custom views. Model annotation tools described herein can also enable IT personnel to customize a dependency model to reflect real-world application and hardware monitoring conditions.

II. Dependency Tracking Overview

Figure 1:
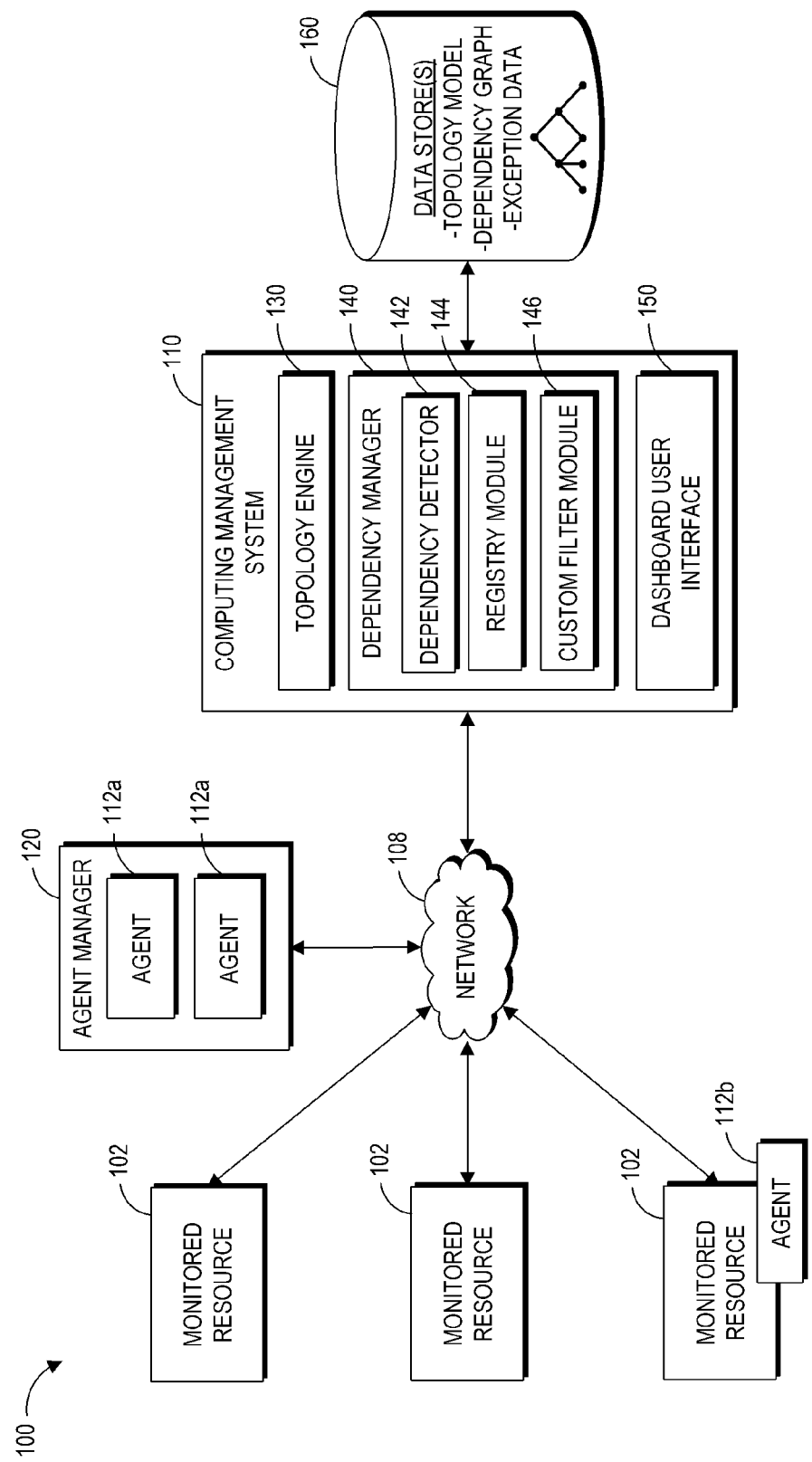
FIG. 1 illustrates an example computing environment including an embodiment of a computing management system.

FIG. 1 illustrates an example computing environment 100 for implementing an embodiment of a computing management system 110. The computing environment 100 includes monitored resources 102 that are monitored by the computing management system 110. The computing management system 110 can monitor the resources 102 for performance tuning reasons, troubleshooting, or other reasons. The computing management system 110 can track relationships between the resources 102 to facilitate monitoring of the resources 102.

In certain embodiments, the computing management system 110 creates a model, referred to herein as a topology model, that stores representations of inherent physical or virtual relationships between resources 102. The computing system 110 can leverage the topology model to further create a dependency model that tracks dynamic relationships or dependencies between resources 102. Dependency information can provide IT personnel with a visualization of which resources 102 affect the performance of other resources 102, facilitating troubleshooting and performance tuning. Advantageously, in certain embodiments, the computing system 110 can provide tools for annotating and filtering the dependency model to provide customized user views into the dependencies.

The monitored resources 102 for which dependencies can be tracked can include physical and/or virtual computing devices, such as physical machines and/or virtual machines. Monitored resources 102 may, for instance, include devices in a data center or in a plurality of data centers. Some examples of monitored resources 102 include the following: virtual machines, servers, web servers, application servers, databases, applications, processors, memories, hard drives or other storage devices, peripherals, software components, database tables, tablespaces in a database, application tiers, network switches and other network hardware, combinations of the same, and the like. Additional examples are provided below. The monitored resources 102 can be geographically separate or collocated.

An agent manager 120 communicates with the computing management system 110, for example, over a network 108, which can be a local area network (LAN) and/or a wide area network (WAN, which may include the Internet). The agent manager 120 includes agents 112a, which can be hardware or software modules that collect data about the monitored resources 102 for submission to the computing management system 110. This data can include performance data, status data, configuration data, combinations of the same, or the like. In the topology model (described in detail below) maintained by the computing management system 110, each of the monitored resources 102 can be considered an object, and data collected about each object can be stored in the topology model. The agents 112a can collect this monitoring data (or object data) remotely by querying libraries or application programming interfaces (API) of the monitored resources 102. For example, the agents 112a can make web service calls to one or more of the monitored resources 102 to obtain monitoring data. The agents 112a can collect this monitoring data periodically, for example, according to a schedule, on-demand, or a combination of the same. Some monitored resources 102 may include one or more agents 112b installed locally with the monitored resources 102. For example, if a monitored resource 102 is a virtual machine, an agent 112b can run from within the virtual machine to obtain monitoring data.

The monitoring data may include information about attributes, characteristics, or properties of the monitored resources 102, such as the number of processors in a physical host device, memory or storage capacity, hardware or software specifications, virtual machine characteristics, and so forth. The monitoring data can also include information about the performance of the monitored resources 102. For virtual machines, this performance information may include information about characteristics as virtual machines per physical host, virtual machine memory allocations, processor load, memory load, remaining free storage, network bandwidth, network latency, or any of a variety of other parameters. This performance data can also include alarms or alerts that indicate whether certain monitored resource 102 characteristics are outside of established performance criteria.

The agents 112a, 112b provide the collected monitoring data to the computing management system 110. The computing management system 110 can include one or more physical or virtual servers that process the monitoring data. A topology engine 130 of the computing management system 110 can transform the monitoring data into the topology model. The topology model can include a plurality of interrelated topology objects, where each topology object can represent a monitored resource 102. The topology model can be a graph or the like, where nodes in the graph represent objects or monitored resources 102 and edges connecting the nodes represent existing relationships between the objects. For example, a set of monitored resources 102 may include a virtual machine, a hypervisor on which the virtual machine runs, and a physical host computing device upon which the hypervisor runs. The topology engine 130 can transform data representing each of these monitored resources 102 into topology objects that are related to each other in the topology model by virtue of their inherent physical or virtual relationships. An inherent relationship between a virtual machine and a hypervisor, for instance, may be that the virtual machine runs on the hypervisor. Similarly, an inherent relationship between a hard disk and a physical host device may be that the hard disk is a component of the physical host device. The topology engine 130 can store the topology model in a data store 160, which can include physical computer storage, one or more databases, one or more file systems, or any combination of the same.

The creation of topology models will now be described in more detail with respect to FIG. 2. In FIG. 2, an example computing management architecture 200 for creating a topology model is shown. The computing management architecture 200 can be implemented by the computing management system 110. The architecture 200 includes a physical layer 210, including the monitored resources 102 of FIG. 1, a data collection layer 220, which can include the agents 112a, 112b of FIG. 1, a topology model layer 230, including the topology model described above with respect to FIG. 1, and a dashboard user interface layer 240. The computing management system 110 data architecture 200, as illustrated in FIG. 2, shows how information from a physical environment can be gathered from one or more monitored resources in the physical environment layer 210 and transformed through the data collection layer 220 into a real-time topology model (the topology model layer 230) that is capable of dynamically representing the complex interconnected nature of the computing environment. The dashboard presentation layer 240 can provide fully customizable views for conducting detailed analyses and presenting results. As will be described in greater detail below, these views can include dependency views that can be customized in several different ways to meet users' monitoring goals.

The physical environment layer 210 can encompass the physical computing environment being monitored, including hardware, software, and observed end-user behavior. The software or hardware components (e.g., monitored resources 102) that the computing management system 110 can automatically discover can include (as a non-limiting list of examples): any device with a network address, such as an IP address; network devices, such as switches, routers, and wireless access points; physical hosts or virtual hosts, including the following virtualization examples: VMware™ (ESX Servers, data centers, data stores, resource pools, clusters, virtual machines), Hyper-V™ (clusters, servers, virtual Machines), Solaris™ zones and containers, and IBM™ AIX partitions (e.g., logical partitions (LPARs), workload partitions (WPARs), or other *PARs); any process running on a server; threads within processes; web servers; Java™ and .NET™ Applications (e.g., enterprise applications and web applications); databases, such as Oracle™ and SQL Server™ databases; physical host components, such as CPU, memory, and hard disk storage; and storage area network components, such as RAID arrays, controllers, Fiber channel components, and SCSI components.

In the data collection layer 220, as described above, agents 112 can be used for data collection. In addition, the computing management system 110 can use other sources for data collection, such as agent-less collection, third party sources (e.g., monitoring tools like IBM™ Tivoli Enterprise Console or HP™ OVO, specialized domain monitoring tools, APIs, SNMP, Windows Management Instrumentation (WMI), scripts, combinations of the same, or the like). As data is collected, the computing management system 110 can build one or more topology models (in the topology model layer 230) by transforming incoming data into a collection-independent form called a canonical data transformation. During transformation, the topology engine 130 of the computing management system 110 can use context data to build objects of a particular type within the topology model(s). For example, when collecting system data, the topology engine 130 can use the name of a resource (such as a host name) to create an object for that resource with the same name as the name of the resource. The decoupling of the physical environment layer 210 from the topology model layer 230 can decouple the topology model layer 230 from the configuration of the physical environment, which may be constantly changing.

Example implementations for collecting data and creating topology models are described in the following U.S. Patents and Applications, each of which is hereby incorporated by reference in its entirety: U.S. Pat. No. 7,979,245, filed May 16, 2007, titled "Model-Based Systems and Methods for Monitoring Computing Resource Performance," ("the '245 patent") and U.S. application Ser. No. 12/370,399 ("the '399 application"). The computing management system 110 and/or agents 112 can implement some or all of the features described in the '245 patent and the '399 application. In addition, in one embodiment, the computing management system 110 and/or agents 112 can implement the features described herein together with at least some of the features of the Foglight™ and/or vFoglight™ software available from Quest Software of Aliso Viejo, Calif.

The topology model can be leveraged to track observed dependencies between objects in the topology model. Referring again to FIG. 1, the computing management system 110 includes a dependency manager 140 that can track dependencies. The dependency manager 140 can use the topology model stored in the data store 160 to generate a dependency model or graph, which can also be stored in the data store 160. In the depicted embodiment, the dependency manager 140 includes a dependency detector 142, a registry module 144, and a custom filter module 146. The dependency detector 142 can track observed dependencies (hardware and/or software) between model objects in the topology model and create a separate dependency graph or graphs. The dependency detector 142 may also annotate the topology model with dependency information, instead of or in addition to creating a separate dependency graph in some embodiments. Among other benefits, the dependency tracking functionality of the dependency manager 140 can help IT personnel automatically identify relationships in their computing environments in order to simplify the process of creating and keeping application service definitions up to date. In addition, dependency tracking can help ensure that IT personnel are assured of a common, up-to-date view of the topology to assist with triage and root cause use cases.

In general, the dependency detector 142 can discover and model infrastructure and transactional dependencies. In some embodiments, the dependency detector 142 observes communications between monitored resources 102 as reported by one or more agents 112. The agents 112 may use netstat or CISCO™ NetFlow commands to detect incoming and outgoing network connections between monitored resources 102. The agents 112 can also use packet sniffers to detect network communications, Java byte-code instrumentation to detect communications between Java components, and/or other tools that detect communications between software and/or hardware components. The dependency detector 142 can identify, from this collected data, resources 102 that are communicating with each other (unidirectionally or bidirectionally). In response to detecting this communication, the dependency detector 142 can create a dependency between the communicating resources 102 as a directed edge in the dependency graph.

The dependency detector 142 can infer dependencies between resources 102 that are topologically related to the communicating resources 102 according to the topology model. For example, a first process running in a first virtual machine may communicate with a second process running in a second virtual machine. The dependency detector 142 can identify this communication from data collected by one or more agents 112 and create a dependency in the dependency graph between the two processes. Further, the dependency detector 142 can look up each of the two processes in the topology model to determine what model objects are related to the two processes. In doing so, the dependency detector 142 can traverse the topology graph to identify the first and second virtual machines as being related to the first and second processes, respectively. Because the two processes have a dependency relationship, the dependency detector 142 can then infer that the two virtual machines also have a dependency relationship. Thus, the dependency detector 142 can leverage the relationships in the topology model to infer dependencies.

In some embodiments, the topology model is stored as a tree abstract data type having one or more tree data structures. More generally, the topology model can be stored as a hierarchical data structure. The dependency detector 142 can then follow ancestor and/or descendant links in the one or more trees to infer dependency relationships among components. For example, referring to FIG. 3A, a simplified example topology model 300 is shown with monitored resources 312-322 arranged in trees. In the topology model 300, physical host 312 root nodes are related to hypervisors 314 running on the physical hosts 312, which are in turn related to virtual machines 316 managed by the hypervisors 314, which are in turn related to operating systems 318 running in the virtual machines, which are in turn related to processes 320 run by the operating systems 318. Further, some of the processes 320 have related threads 322. Ellipsis are drawn to indicate that not all monitored resources may be shown.

In the dependency example described above, two processes communicated with each other and were hence dependent on each other. Likewise, in the depicted embodiment, two of the processes 320 communicate with one another either bidirectionally or unidirectionally. Agents 112 or other data collection mechanisms can detect this communication between processes 320, and the dependency detector 142 can analyze this collected data to identify the communication between the processes. Doing so, the dependency detector 142 detects a dependency relationship between the two processes, which the dependency detector 142 stores an indication of in the data store 160. An arrow 302 indicates this dependency between the processes 320.

Once the dependency detector 142 has identified this dependency, the dependency detector 142 can traverse the tree in the topology model 300 to infer dependencies between ancestors of the processes 320. Thus, in the depicted example embodiment, the dependency detector 142 infers a dependency (304) between the two operating systems 318, as well as a dependency (306) between two virtual machines related to the processes 320, a dependency (308) between hypervisors 314, and a dependency (310) between physical hosts 312. In a troubleshooting scenario, a user trying to identify problems with a first host 312 (or other resource) can review other components dependent on the first host 312, such as other hosts 312, to identify the specific element causing the first host 312 to experience issues. In some embodiments, dependencies (not shown) can also be inferred between descendants of the processes 320, such as between the threads 322.

Some additional examples of dependencies that the dependency manager can discover or infer include the following: process to host (process X runs on host X), process/host to host (process X on host X to host Y), process/host to process/host (process X on host X to process Y on host Y), host to network device (e.g., host X talks to router Y), application component to host (e.g., database X runs on host X), virtual hosts to virtual controller, and virtual machine to storage location (RAID array, logical unit number (LUN), etc.). These dependencies can be considered to be dependencies between infrastructure components (physical or virtual) of a computing environment. Another type of dependency is a dependency between application or transactional components, some examples of which include an application server to a Java Database Connectivity (JDBC) resource (e.g., Java server X talks to database server Y), relationships between queues in WebSphere™ MQ series systems, end-user requests to web servers, application servers to enterprise applications (e.g., enterprise application X uses the following enterprise Java Beans (EJBs), servlets, etc.), single trace end-user requests to java executions, and application components to application tiers (e.g., database+ host=database tier).

Although not shown, in some embodiments, certain monitored resources 102 or objects can be further grouped together into services. For instance, services can include logical groupings of hosts and/or other objects together based on functionality. As one example, a service can represent a web application that is implemented on one or more virtual machine hosts. Services may be user-definable, and data representing services can be stored in the topology model. A service can, for instance, be a parent object to one or more virtual host objects or other objects representing other monitored resources 102. Services provide a mechanism for users to represent their IT infrastructure in ways that mirror business views of IT.

Referring again to FIG. 1, dependencies can be output to users via the dashboard user interface module 150. For example, trees such as those shown in FIG. 3A or the like could be output to users with connections drawn between dependent components. Other views can be used to output dependency data, including tables (see, e.g., FIG. 6, described below). However, in any of these views, it can be desirable to surface or present to users relevant information while suppressing less relevant information. Although dependencies can be inferred between several objects in the topology model based on an observed dependency between two objects, outputting too many dependencies for presentation to users can produce visual clutter that can obscure more significant relationships between objects. Thus, it may be desirable to hide certain dependencies in various views. Moreover, different dependencies may be relevant to different users. Data storage administrators, for instance, may wish to see dependencies solely between physical storage components, whereas virtual machine administrators may wish to obscure such dependencies and see relationships between virtual machines instead.

Advantageously, in certain embodiments, the dependency manager 140 includes a registry module 144 and a custom filter module 146 that enable custom dependency views to be generated. The registry module 144 can provide functionality for users to annotate dependency models to specify registry variables that define exceptions to dependency models. The registry variables or exceptions can include instructions or indications that the dashboard user interface module 150 can use to modify the dependency model and/or render dependencies. Referring again to the example dependencies shown in FIG. 3A, some users may wish to exclude dependencies between operating systems 318 or hypervisors 314 from dependency views because\e showing these dependencies may provide little useful information to those users. The registry module 144 can provide a user interface or scripting interface that allows users to specify exceptions for excluding dependencies between operating systems 318, hypervisors 314, or any other objects from the output provided by the dashboard user interface module 150.

More generally, the registry module 144 can allow users to exclude or add any type of dependency to a dependency model. The registry module 144 can store user-specified exceptions in the data store 160. The stored exceptions can act as rendering directives that affect the dependency views rendered for output by the dashboard user interface module 150. In another embodiment, the exceptions modify the dependency model itself to break or otherwise remove unwanted dependencies (or add new dependencies).

Like the registry module 144, the custom filter module 146 can provide a mechanism for customizing dependency views. The custom filter module 146 can provide functionality for users to create custom filters that dynamically select dependencies from the dependency model based on various criteria. The custom filter module 146 can provide software or hardware tools for users to create scripts that can define the custom filters. For example, the custom filter module 146 can include a custom filter API that has routines for defining custom views of dependency data. Custom filters can accomplish some or all of the same purposes as exceptions, such as excluding certain dependencies, but may be more flexible than exceptions. Custom filters can also allow users to control the layout of objects in a dependency view. In addition, the custom filters can use the exceptions in the registry as part of the dependency data filtering process in some instances.

The registry module 144 and the custom filter module 146 can be used by a vendor or provider of the computing management system 110 to adjust dependency views. The vendor may ship or otherwise provide the computing management system 110 with one or more predefined exceptions and one or more custom filters in some cases. In other embodiments, the registry module 144 and the custom filter module 146 can also or instead be used by customers of the vendor, including administrators of the computing management system 110. Administrators can extend the functionality of the exceptions and filters provided by the vendor or may create their own exceptions and custom filters.

It should be noted that the registry variables created using the registry module 144 can be used at different times. Some registry variables, such as the example variable described above for defining object parents, can be initially used by the dependency detector 142 when building the dependency model or graph. Other registry variables, such as variables that allow parent objects to be skipped, can be accessed by the custom filter module 146 and/or dashboard user interface module 150 when generating dependency views (see, e.g., FIG. 3B below). In other embodiments, certain registry variables are accessed both by the dependency detector 142 at dependency graph build time and by the custom filter module 146 and/or dashboard user interface module 150 when generating dependency views.

Figure 3A:
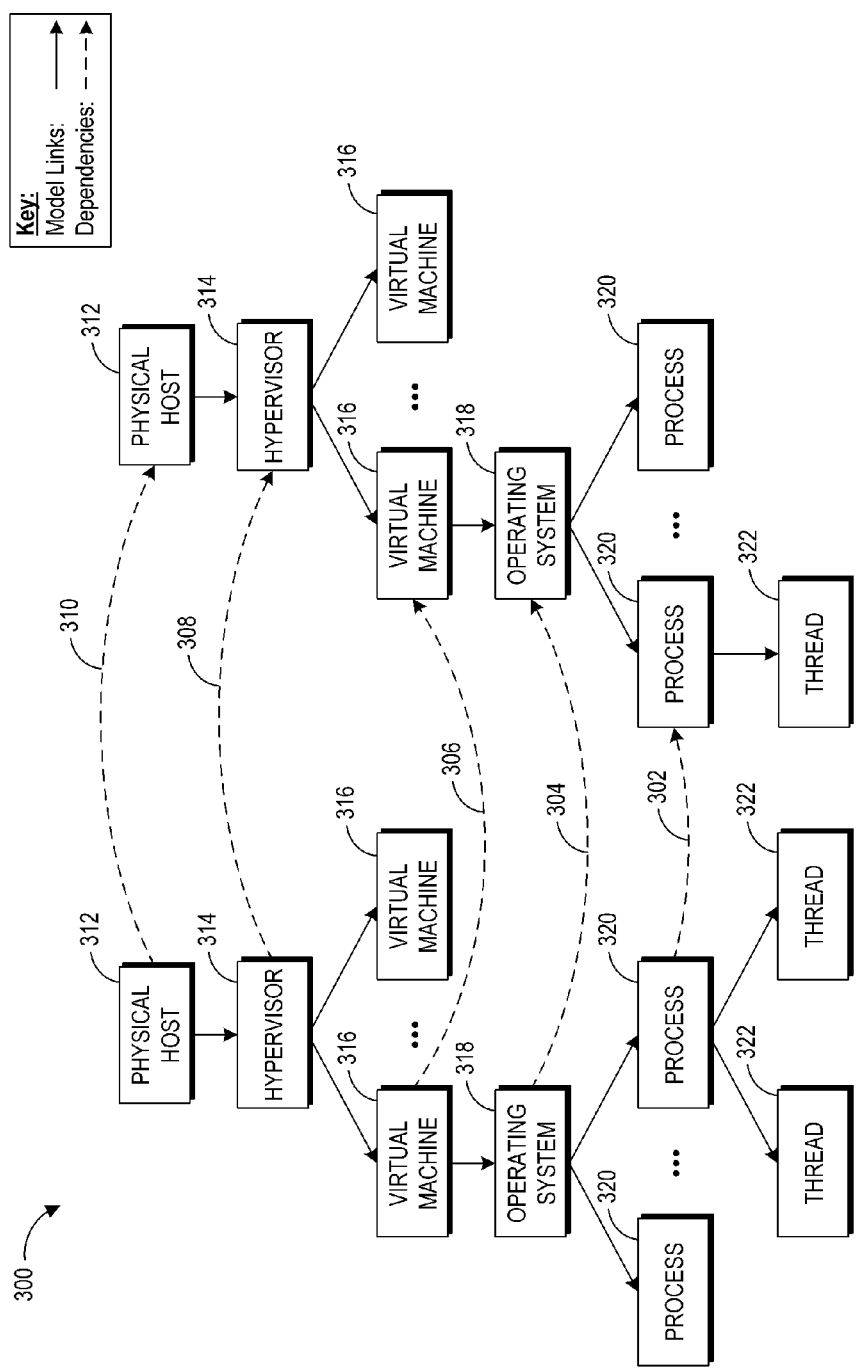
FIG. 3A illustrates example dependency mappings that can be implemented by the computing management system of FIG. 1.
Figure 3B:
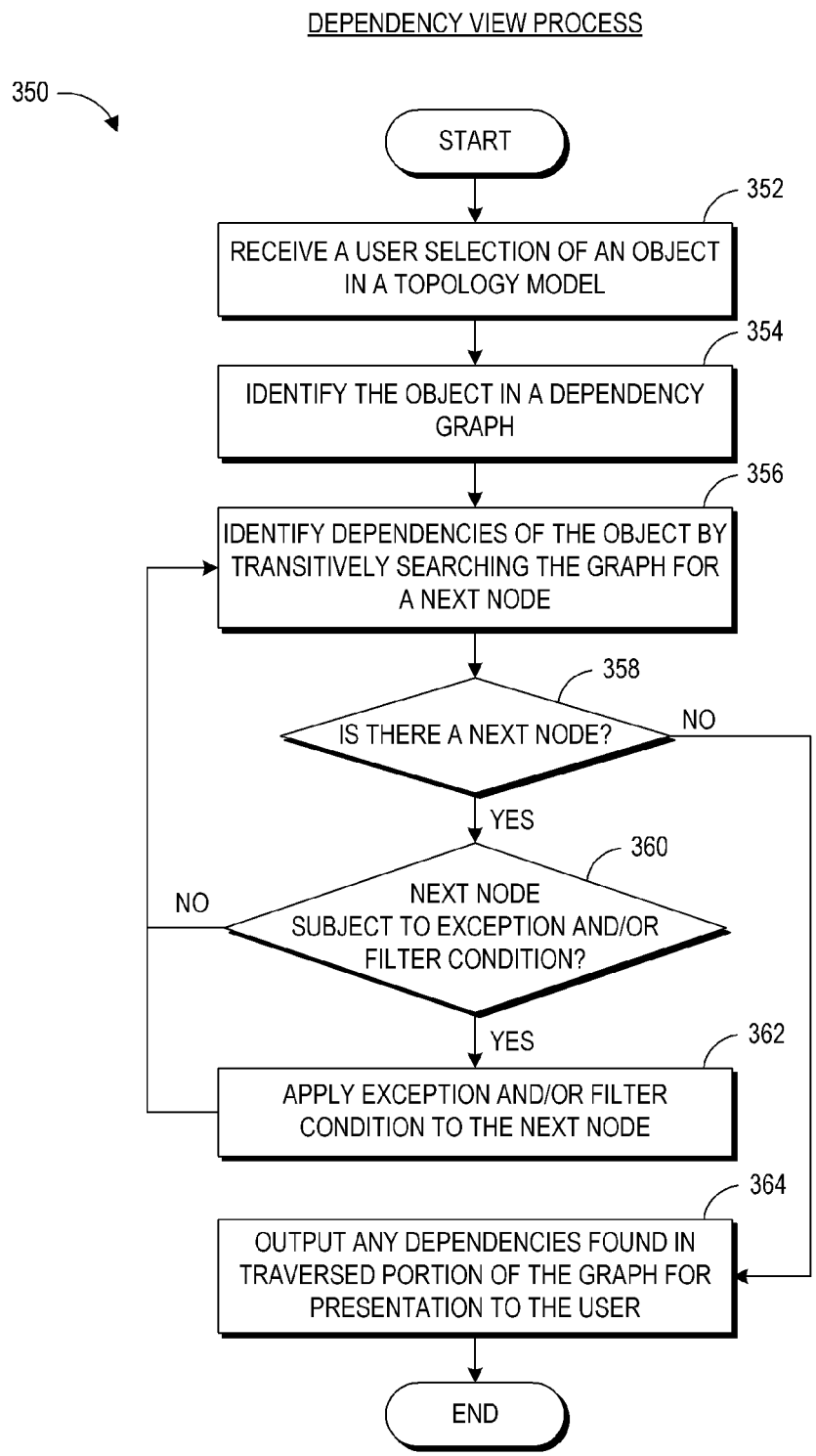
FIG. 3B illustrates an embodiment of a dependency view process.

Referring to FIG. 3B, an example dependency view process 350 is shown. The dependency view process 350 can be implemented by the computing management system 110. A computing system other than the computing management system 110 of FIG. 1 could also implement the dependency view process 350. For convenience, however, the process 350 will be described with respect to the computing management system 110. The dependency view process 350 can advantageously provide custom dependency views to users. The dependency view process 350 is described as being initiated by a user selection of an object for which dependencies may be retrieved. However, embodiments of the dependency process 350 may also be initiated without user input.

The process 350 begins at block 352, where the dashboard user interface module 150 receives a user selection of an object in a topology model. The user selection can be provided in response to first outputting one or more topology objects for display to the user. In another embodiment, a menu of available types of topology objects can first be output for display to the user (see, e.g., FIG. 4), from which the user can make the selection of a topology object or type of topology object. Subsequently, the custom filter module 146 can apply one or more filters, including custom filters, to obtain dependencies related to the selected object.

At block 354, the custom filter module 146 can identify the object in a dependency graph. The custom filter module 146 can identify dependencies of the object by transitively searching the graph for a next node (where each node represents an object) at block 356. If there is a next node (block 358), the custom filter module 146 can evaluate whether the next node is subject to an exception and/or filter condition at block 360. If so, the custom filter module 146 applies the exception and/or filter condition at block 362. For example, if the initially selected object was a process and the next node is an operating system associated with that process, the custom filter module 146 can determine whether an exception exists in the registry for skipping operating systems in a dependency tree. As another example, if a custom filter specifies that host dependencies are to be obtained, the custom filter module 146 may skip nodes in the dependency graph that correspond to objects other than hosts.

If there is no applicable exception or filter condition, the process 350 can loop back to block 356, where the custom filter module 146 searches for a next node. If there is no next node at block 358, the dashboard user interface module 150 outputs any dependencies found in the traversed portion of the dependency graph for presentation to the user at block 364. Several example user interfaces and dependency views are described in greater detail below.

In some embodiments, the custom filter module 146 performs another embodiment of a dependency view process by initially traversing a dependency graph to identify nodes and edges. The custom filter module 146 can then apply filer conditions to the nodes and edges by accessing properties in the topology model of the objects corresponding to the identified nodes.

III. Dependency Visualization Overview

FIGS. 4 through 7 illustrate example dependency browsing user interfaces 400-700. The dependency browsing user interfaces 400-700 can be generated by the computing management system 110, and in particular, by the dashboard user interface module 150. The dependency browsing user interfaces 400-700 can be implemented in a web browser or in any other application.

Figure 4:
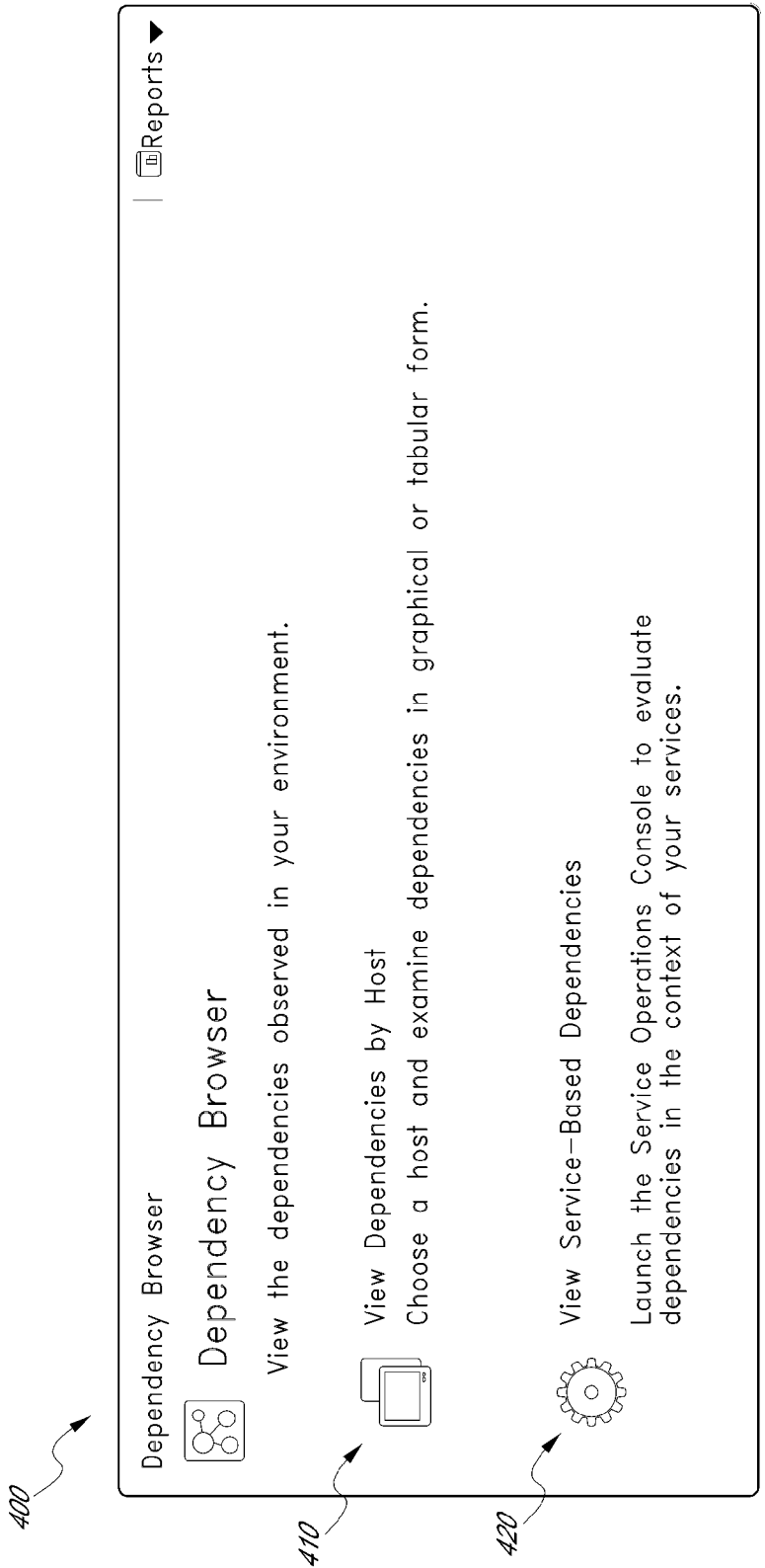
FIGS. 4 through 7 illustrate example dependency browsing user interfaces.

The user interface 400 of FIG. 4 is an example dependency browsing menu that enables a user to browse dependencies by virtual host via user interface control 410 or by service via user interface control 420. As described above, a service can include a grouping of other objects, such as virtual hosts (commonly referred to herein simply as "hosts"). The user interface control 410 can enable a user to choose a host and examine dependencies that include hosts in graphical or tabular form. Likewise, the user interface control 420 can enable a user to choose a service and examine dependencies that include services in graphical or tabular form. In response to a user selecting the user interface control 410, the dashboard user interface module 150 outputs the user interface 500 of FIG. 5 or the user interface 600 of FIG. 6. By selecting the user interface control 420, the dashboard user interface module 150 outputs the user interface 700 of FIG. 7.

Of note, among the many types of monitored resources 102 described above, only hosts and services may be selected for viewing in the user interface 400. The restriction of options to viewing hosts or services can be made by the registry module 144 and/or custom filter module 146. A particular user may wish to view only host or service dependencies, instead of other dependencies, and therefore may specify an exception via the registry module 144 that restricts dependency views accordingly.

Figure 5:
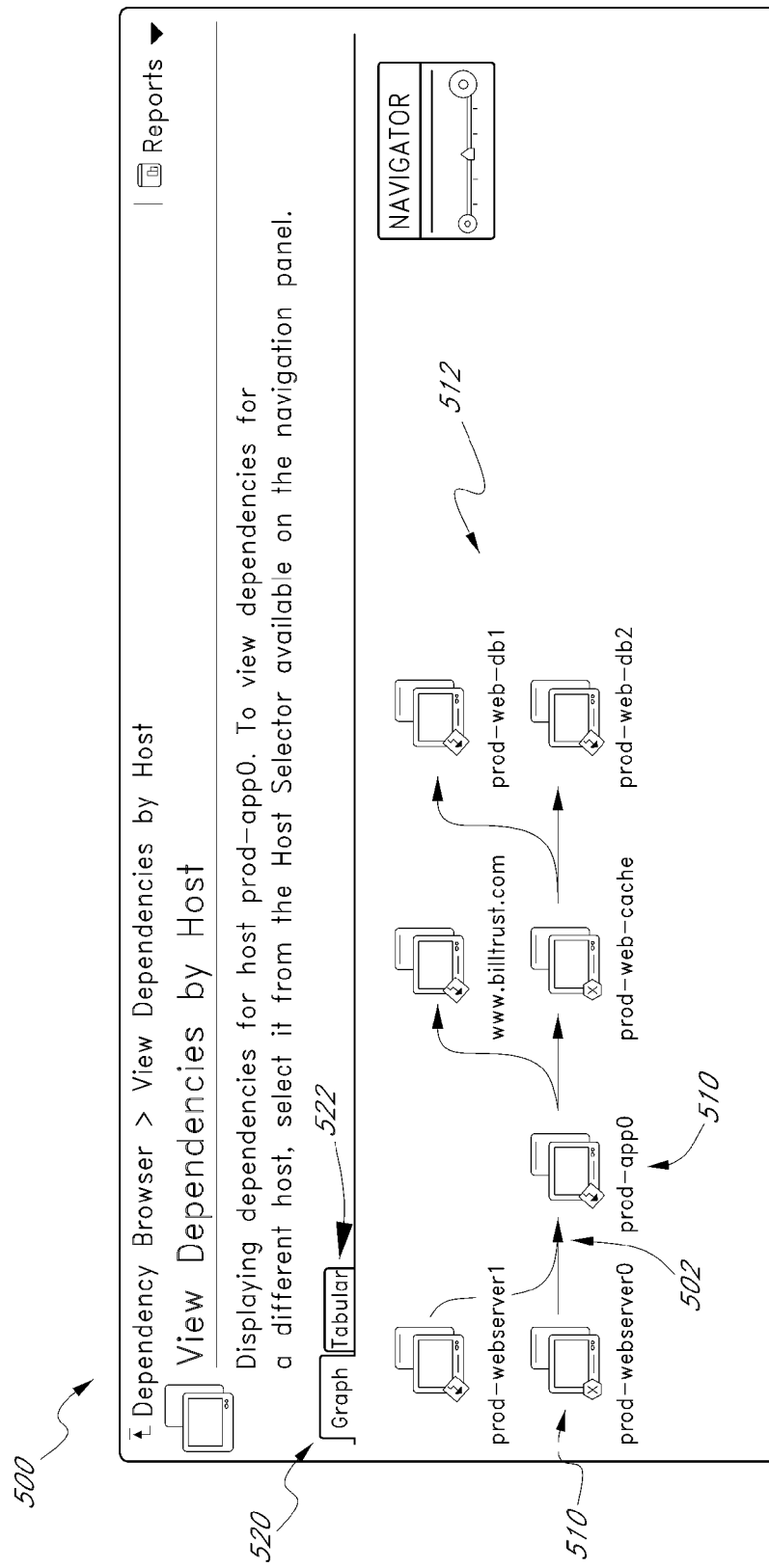

Turning to FIG. 5, the user interface 500 depicts dependencies between hosts. In the depicted embodiment, a graph tab 520 is selected (e.g., by a user), which outputs a dependency graph 512. In the dependency graph 512, hosts 510 are shown dependent on other hosts via arrows 502. Thus, for example, the host 510 prod-webserver0 is dependent on host 510 prod-app0, which is dependent on host 510 prod-web-cache and www.billtrust.com, and so on. The arrows 502 are unidirectional and reflect that one host 510 in the dependency acts a client and the other host 510 (to which the arrow points) acts as a server in the dependency. Some dependencies may have bidirectional arrows 502 in some embodiments.

Figure 6:
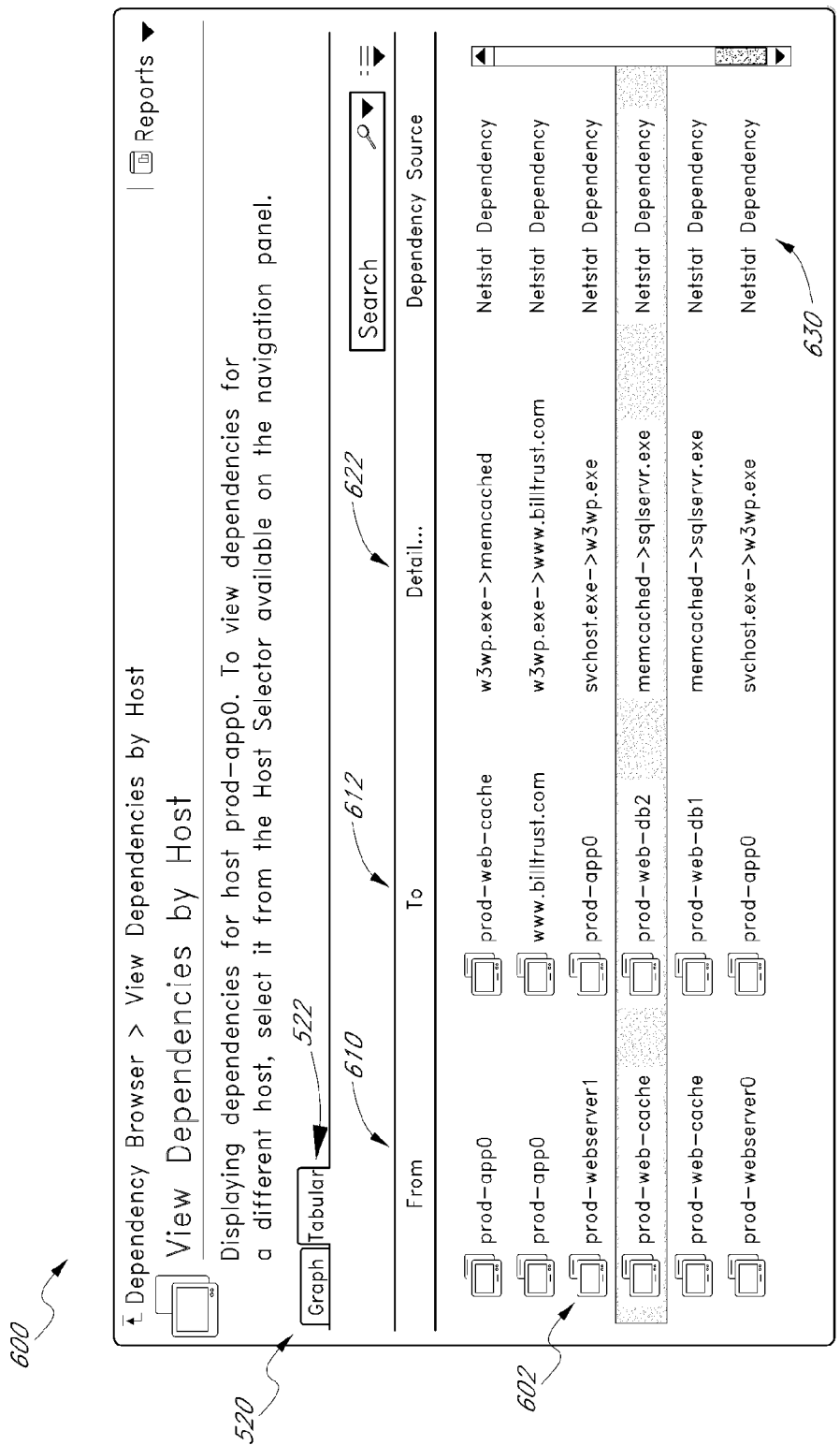

By selecting the tab 522 marked "Tabular," the user can cause the dashboard user interface module 150 to output dependencies in tabular format as shown in the user interface 600 of FIG. 6. In this user interface 600, a table 602 of dependencies includes a "from" column 610 and a "to" column 612, indicating that hosts in the "from" column have a dependency to the hosts in the "to" column 612. A third column 622 provides more details as to which processes resulted in the dependencies between hosts being inferred. For instance, in the first line of the table 602, host prod-app0 has a dependency with host prod-web-cache because the processes w3wp.exe and memcached have a dependency. A fourth column 630 indicates the source of identifying this dependency, which in the depicted embodiment includes the netstat command described above.

Figure 7:
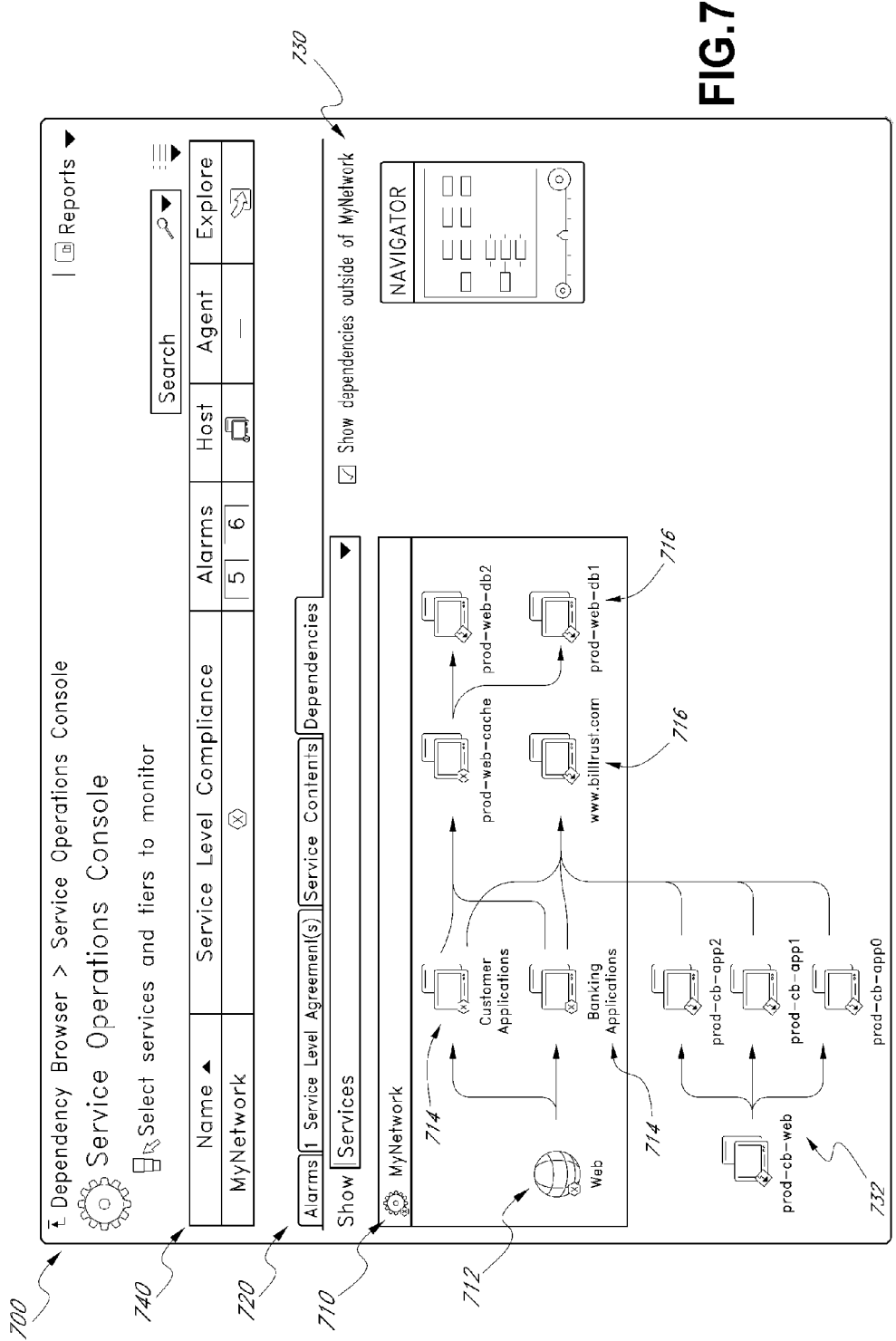

Turning to FIG. 7, the user interface 700 includes dependencies organized by service. A single service 710 is shown, called "MyNetwork." This service 710 may have been created by a user or detected automatically. The MyNetwork service 710 includes several objects, such as a web object 712, customer and banking applications objects 714, and host objects 716. Arrows between these components indicate dependencies as in FIG. 5. Likewise, additional host objects 732 not part of the service 710 are shown depending on aspects of the service 710. These dependencies outside of the service 710 are shown because an optional control 730 for showing dependencies outside of the service 710 is selected (e.g., checked) by a user. In addition, tabs 720 in the user interface 700 provide options for users to view alarms, service level agreements (SLAs), and service contents of the service 710 in more detail. Another view of these alarms and service level compliance is shown in a status bar 740.

IV. Registry Variable Examples

In the tree example of FIG. 3A, dependencies detected between processes were leveraged to infer dependencies between parents of those processes in the topology model. When making these inferences, the dependency detector 142 can assume that parent objects in the topology model are parents of child objects in the topology model. However, it may be desirable to modify objects' parentage to be different from that of the topology model to reflect different types of relationships among objects. As described above, the registry module 144 provides functionality for users to annotate or otherwise modify the dependency model. The registry module 144 can enable users to define new object parents (including multiple parents), new object children, and the like. In some embodiments, the dependency detector 142 uses data in the registry to determine which dependencies to show in a custom dependency view instead of or in addition to using a custom filter for the same purpose.

Figure 8:
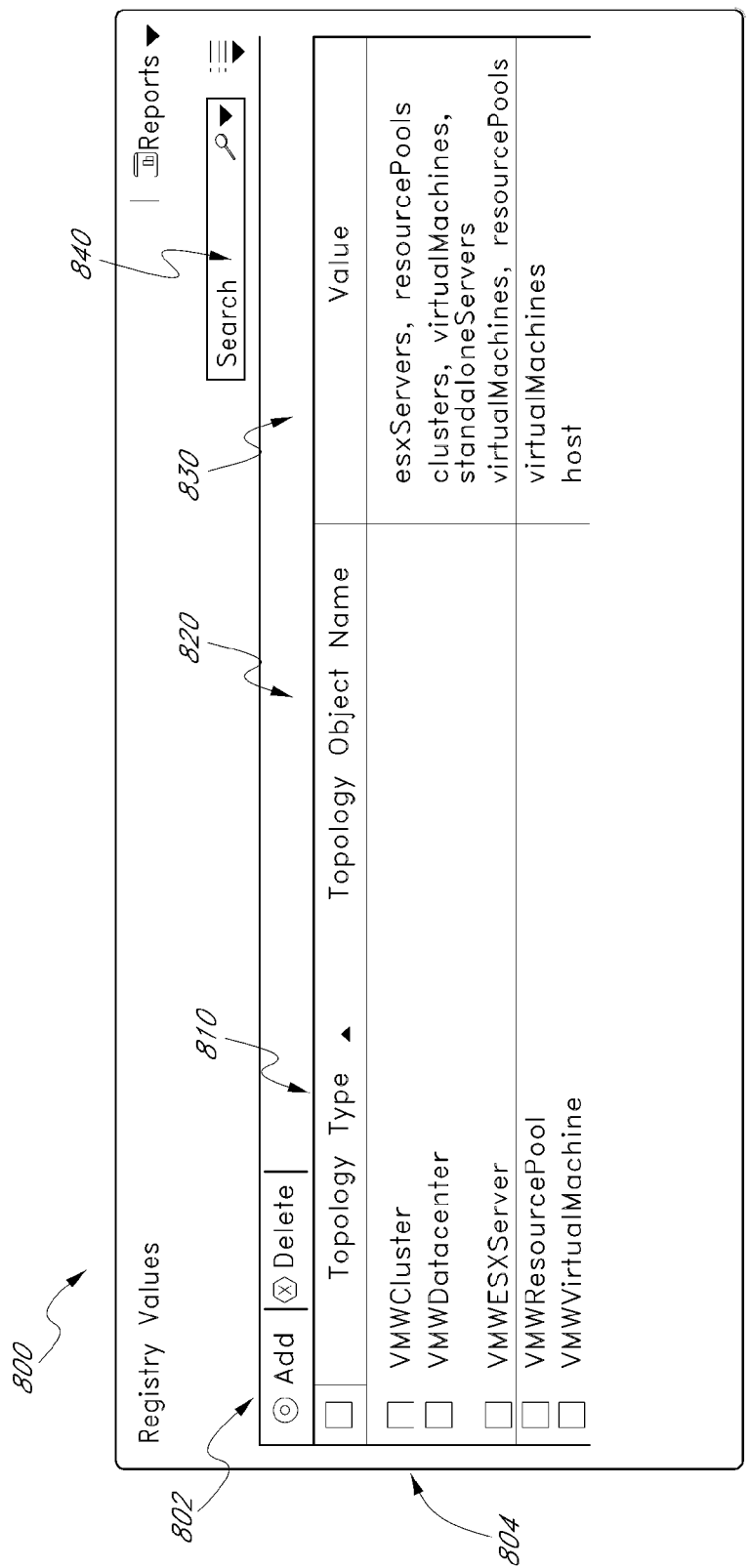
FIG. 8 illustrates an example registry variable editing user interface.

An example of a registry user interface 800 that can be implemented by the registry module 144 is shown in FIG. 8. The registry user interface 800 includes a table of registry values that may be edited by a user for a particular registry variable (not shown). The registry variable corresponding to the registry values shown is an example variable called Dependency_Mapping_Parent_Properties. Other examples of registry variables are described below, and the registry user interface 800 shown can be used to edit any of these registry variables.

The registry variable Dependency_Mapping_Parent_Properties can specify which objects are defined to have a child relationship with certain parent topology object types. The parent topology object types are listed in a topology type column 810, while the child objects are listed in a value column 830. A third column, topology object name 820, can be used to specify specific topology objects and is blank in this example (in other examples, parentage or other attributes of specific topology objects can be manipulated using this column). Thus, for example, the objects esxServers and resourcePools in the same row 804 of the table as the VMWCluster topology type indicates that both esxServers and resourcePools (VMWare™ ESX servers and resource pools) are children of the VMWCluster (VMware™ cluster) object type. Add and delete buttons 802 are provided for adding or deleting registry values. For example, the add button 802 allows a user to specify further parent-child relationships, while the delete button 802 allows a user to delete a parent-child relationship.

Thus, in an embodiment, when inferring dependencies from children to parents, the dependency manager 142 of FIG. 1 can first check if a special parent exception has been specified in the registry variable Dependency_Mapping_Parent_Properties for a given object type. If so, the dependency detector 142 can infer a parent dependency based on a child-parent relationship specified in the Dependency_Mapping_Parent_Properties variable. If no custom parent relationship is specified in the registry, the dependency detector 142 can follow the default parent-child links in the topology model to infer dependencies when building the dependency model.

There are many other examples of registry variables that can be edited by users using the registry module 144. For example, similar to the Dependency_Mapping_Parent_Properties variable, one registry variable can allow users to define children of other objects rather than parents of other objects. Additional registry variables can be created for ignoring or skipping parent or child objects when inferring dependencies. For example, as described above, it can be desirable for some users to ignore certain inferred dependencies, such as dependencies between operating systems or hypervisors. A registry variable for ignoring parent dependencies, for instance, might allow a user to specify a value "host" in the user interface 800 of FIG. 8 and a topology type of VMWESXServer (VMware™ ESX server) to specify that a hypervisor parent should be ignored or skipped when inferring dependencies from virtual hosts. Different registry values can specify whether to ignore a parent (or child) object by skipping the parent (or child) and continuing to traverse the topology/dependency tree or ignoring a parent (or child) object and stopping inferring dependencies any further up (or down) the tree. One example scenario where stopping inferring dependencies further up (or down) the tree can include databases, where ignoring a database can result in storage devices attached to the database being ignored as well. It may be useful to simply specify that the database is to be ignored without having to also specify that the storage devices should be ignored. The registry module 144 can therefore enable different users to ignore different types of dependencies to suit users' different monitoring objectives.

V. Custom Filter Examples

The custom filter module 146 described above can provide an API or scripting interface that enables a user to specify custom filters for viewing dependency data. Custom filters will be described initially using the example dependency views 900A-900G shown in FIGS. 9A through 9G. The dependency views 900A-900G can be output in a similar user interface to any of the user interfaces 500-700 described above. Each of the views shown can be output by the dashboard user interface module 150.

Figure 9A:
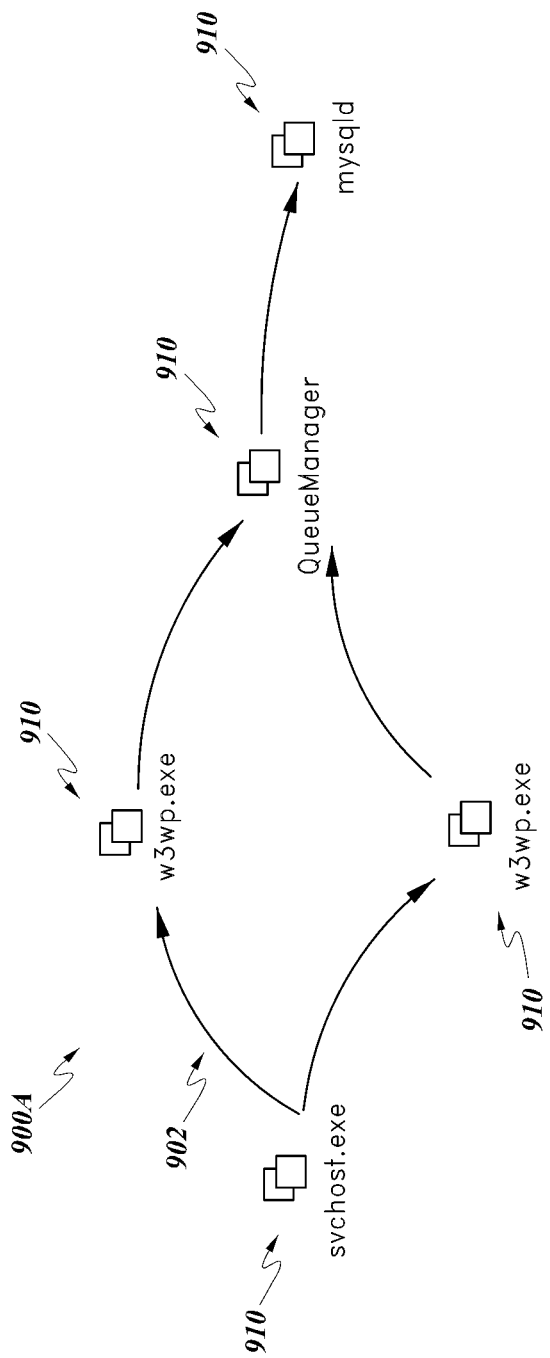
FIGS. 9A through 9G illustrate example dependency views.

Referring to FIG. 9A, a dependency view 900A is shown with directly observed dependencies 902 between processes 910. In some cases, it may be desirable to depict inferred dependencies based on these directly observed dependencies 902. For example, a dependency view 900B is shown in FIG. 9B, where dependencies 904 between hosts 920 are shown.

Custom filters can be created for the purpose of outputting inferred dependencies. The custom filter module 146 described above can provide a user interface, scripting interface, or API that enables users to create custom filters for depicting inferred dependencies. The custom filter module 146 can store these custom filters for later access by users. The dashboard user interface module 150 can provide access to these custom filters by outputting a user interface (such as the user interface 400 of FIG. 4) that provides a menu to view dependencies. User selection of an item in the menu can cause the custom filter module 146 to execute one or more of the custom filters. Options for viewing dependencies can be provided in other ways than the menu shown in FIG. 4. For instance, the dashboard user interface module 150 can provide any type of user interface control for selecting dependencies for viewing, such as drop-down boxes, radio buttons, text boxes (including search functionality), tables, graphs, combinations of the same, or the like.

Figure 9B:
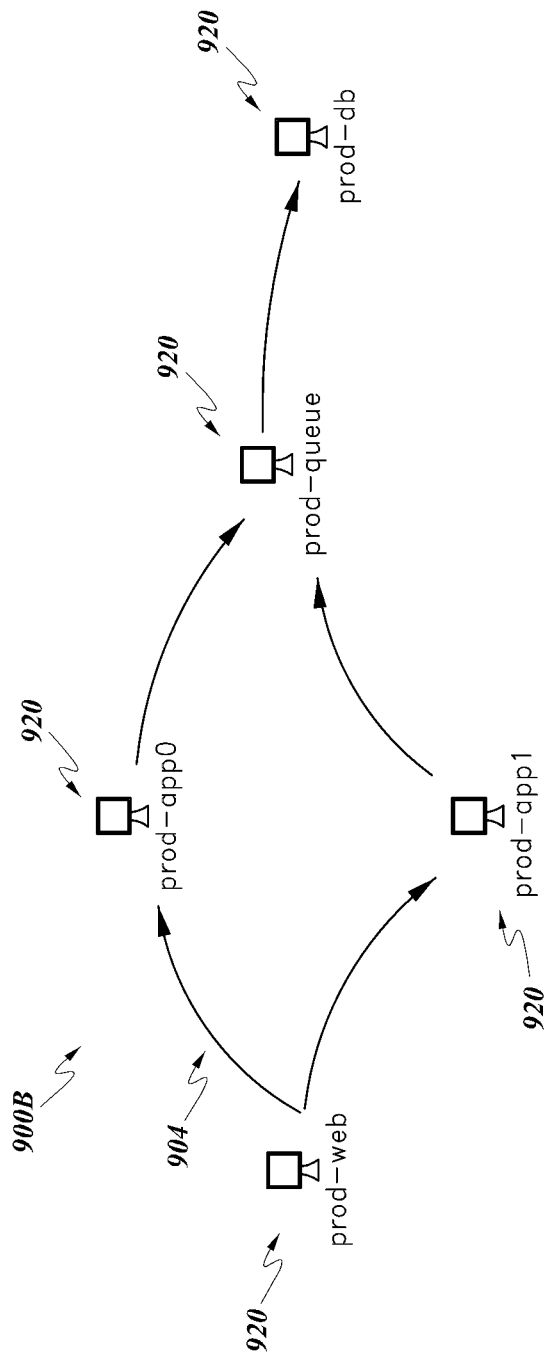

An example custom filter that enables users to view dependencies between hosts instead of processes, as in FIG. 9B, is the following:

---
Example Custom Filter 1
---
```
builder.FilterChain {
  FilterDefinition (
    filterMethod : Any( ),
    displayOption : Node(
      rollup: HostRollup( )
    ),
    layer : LayerByTier( )
  );
};
```
---

In the above filter example, the custom filter includes a filter chain (FilterChain), which can be a class or other logical grouping that contains an ordered list of filter definitions (FilterDefinition). Each filter definition can be a routine (e.g., function or method) that applies a set of rendering directives or commands to nodes in the dependency graph. While a single filter definition is shown in this filter chain, there may be multiple filter definitions in other filter chains, examples of which are described below. The filterMethod command within the filter definition can specify which initial objects are to be identified. In this example, the filterMethod command specifies that any objects are to be identified via an Any( ) routine, without filtering objects based on regular expressions or string matching (see below). The Any( ) routine can obtain objects that are transitively related to one or more objects selected by a user for dependency viewing, thereby obtaining the dependency graph related to the user-selected objects. Thus, for example, a user selection of an object at block 352 of the process 350 (see FIG. 3B) can be processed by the "filterMethod:Any( )" command to find the dependencies of that object (e.g., corresponding to blocks 354 and 356 of the process 350). For instance, in one embodiment the filterMethod command is tested against some or all ancestors (recursively defined by the parentage) of the user-selected objects.

The retrieved objects can be filtered or otherwise have a subset selected thereof using a displayOption command. The rollup command selects objects from the objects found by the filterMethod at a level of the dependency graph specified in the rollup condition (in this example, at the level of hosts according to the command, "rollup:HostRollup( )."). Rolling up the objects to select a subset thereof is one example of the process 350 applying a filter condition to successive nodes in the dependency graph at blocks 360 and 362 (see FIG. 3B). Rolling up objects can return objects that have direct or inferred dependencies at any desired level of the dependency graph.

A layer command in the custom filter defines an ordering of the rolled-up objects for display. As shown, the hosts 920 are grouped roughly into columns, with a prod-web host 920 in a first column, prod-app0 and prod-app1 hosts 920 in a second column, a prod-queue host 920 in a third column, and a prod-db host 920 in a fourth column. The layer command can affect the ordering of objects in these columns. By specifying that the layering will done by tier ("LayerByTier( )"), the output of the columns correspond logically from left to right, depicting each successive object to the right of the object from which it depends. The layer command can be adjusted to change the ordering of these columns, among other options. The dashboard user interface module 150 can execute the example custom filter 1 to obtain a set of display results, which the dashboard user interface module 150 can then output for display to a user.

The example custom filter 1 above can be modified to display both hosts and processes together, with processes contained by their parent hosts, with the following custom filter 2:

---
Example Custom Filter 2
---
```
builder.FilterChain {
  FilterDefinition (
    filterMethod : Any( ),
    displayOption : Node(
      groupBy: HostGroupBy( )
    ),
    layer : LayerByTier( )
  );
};
```
---

Figure 9C:
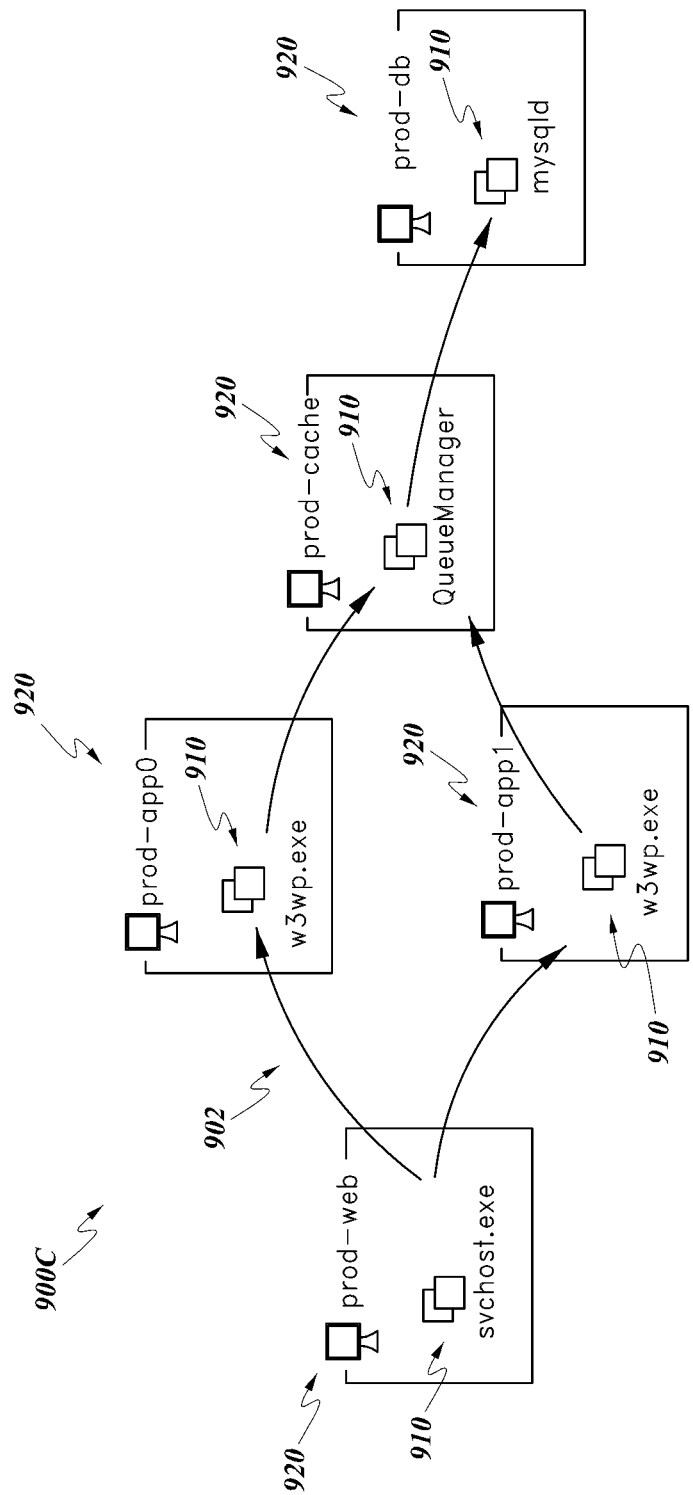

The groupBy command causes the retrieved objects to be grouped together according to one or more specified criteria, which in this example is by host (HostGroupBy( )). The one or more specified criteria can be a shared property of the objects, such as the same name or type of the objects, among others. Example output of the example custom filter 2 is shown in FIG. 9C, where the processes 910 are shown contained in or grouped by their respective hosts 920.

The rollup and groupBy commands can be used together. For example, the following example custom filter can rollup to hosts and then group the hosts by services:

---
Example Custom Filter 3
---
```
builder.FilterChain {
  FilterDefinition (
    filterMethod : Any( ),
    displayOption : Node(
      rollup: HostRollup( ),
      groupBy: ServiceGroupBy( )
    ),
    layer : LayerByTier( )
  );
};
```
---

Figure 9D:
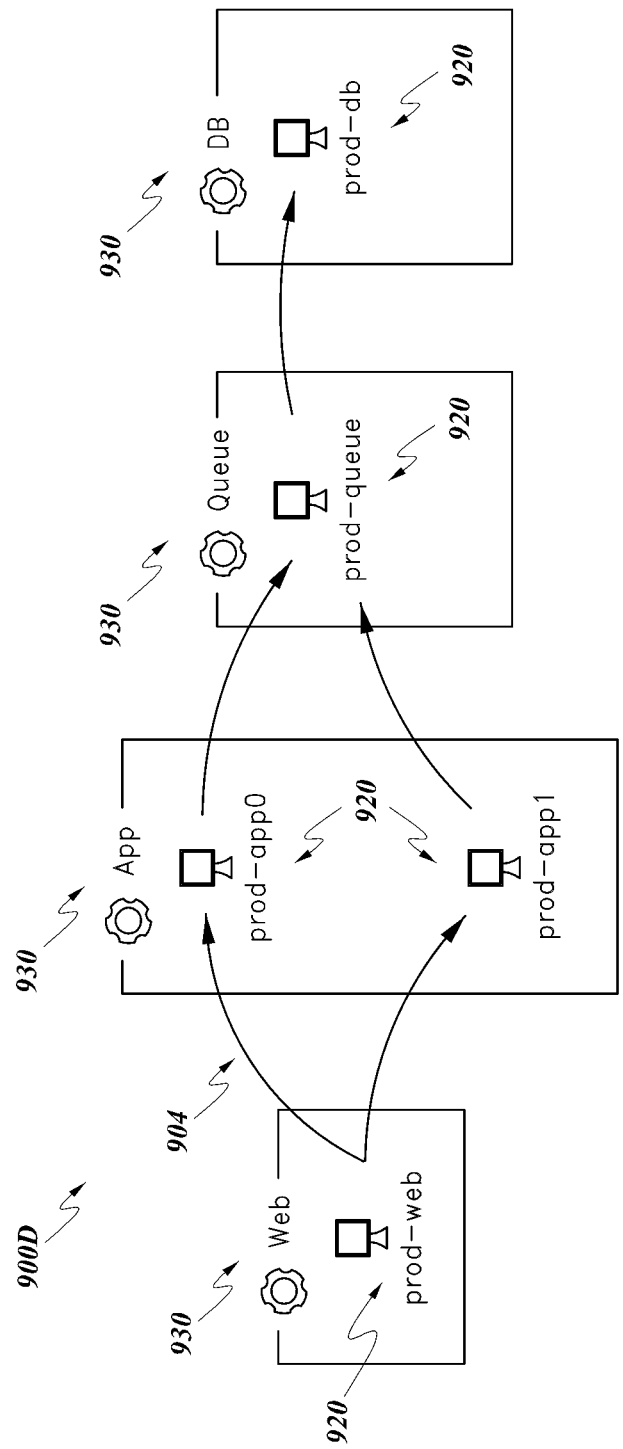
Figure 9E:
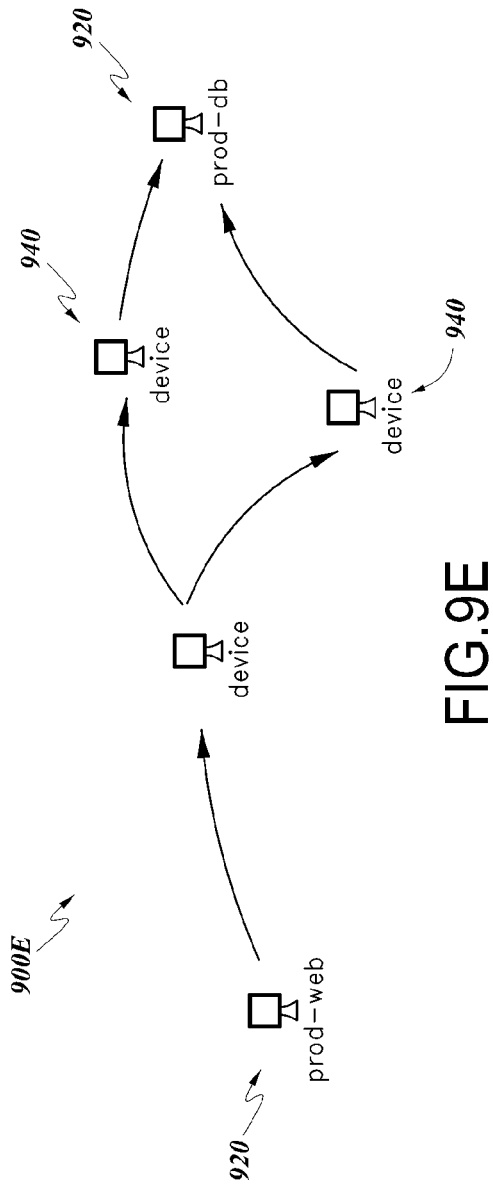
Figure 9F:
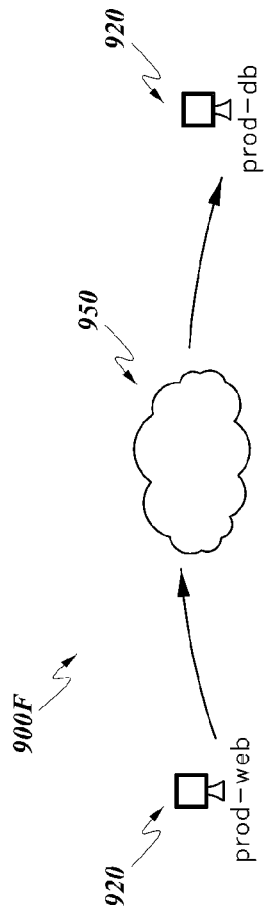

The resulting output is shown in FIG. 9D, where the dependencies 904 between hosts 920 are shown, and where the hosts 920 are shown contained in their respective parent services 930. In an embodiment, the rollup command is interpreted strictly, such that if an object fails to roll up (e.g., has no parent), the object is passed to the next filter definition in the filter chain for rendering. In contrast, the groupBy command may be non-strict by default, such that when no group object is found, the object can be depicted without a box around it. These default options for the rollup and groupBy commands can be changed in certain embodiments.

Sometimes, a user would like to see a subset of the objects in a group of dependencies. For example, in the scenario 900E shown in FIG. 9E, several devices 940 are shown with intermediate dependencies between two hosts 920, but a user may not wish to see the clutter of these intermediate or indirect dependencies. The custom filter module 146 can include a command that allows intermediate dependencies or other dependencies between two or more objects to be shown as a cloud or the like, as shown by the cloud 950 in FIG. 9F. The following custom filter includes a second filter definition that enables the devices 940 of FIG. 9E to be shown as the cloud 950 of FIG. 9F:

---
Example Custom Filter 4
---
```
builder.FilterChain {
  FilterDefinition (
    filterMethod : ObjectName(regex : 'prod.*'),
    displayOption : Node( ),
    layer : LayerByTier( )
  );
  FilterDefinition (
    filterMethod : Any( ),
    displayOption : Cloud( ),
    layer : LayerByTier( )
  );
};
```
---

In this example custom filter, two filter definitions are included, which can be executed in order. The filter method routine in the first filter definition, instead of looking for any object using the "Any( )" command, looks for specific prod-related object names using the "ObjectName(regex: 'prod.*')" command. The regex command embedded within the ObjectName( ) command causes a regular expression to be executed that searches for nodes named 'prod.' (where "*" is a wildcard character), returning the prod-web and prod-db nodes. The "displayOption:Node( )" command then displays each of these objects as nodes. The subsequent filter definition includes a filter method command that searches for any remaining objects (using the "Any( )" command) and displays them as a cloud using the display option "Cloud( )." The display option "Cloud( )" enables the cloud 950 to be shown in place of the nodes 940.

As an extension of the example custom filter 4, regular expressions (regex) can be used in other contexts, such as in identifying certain types of objects (such as services or hosts) rather than specific objects.

Figure 9G:
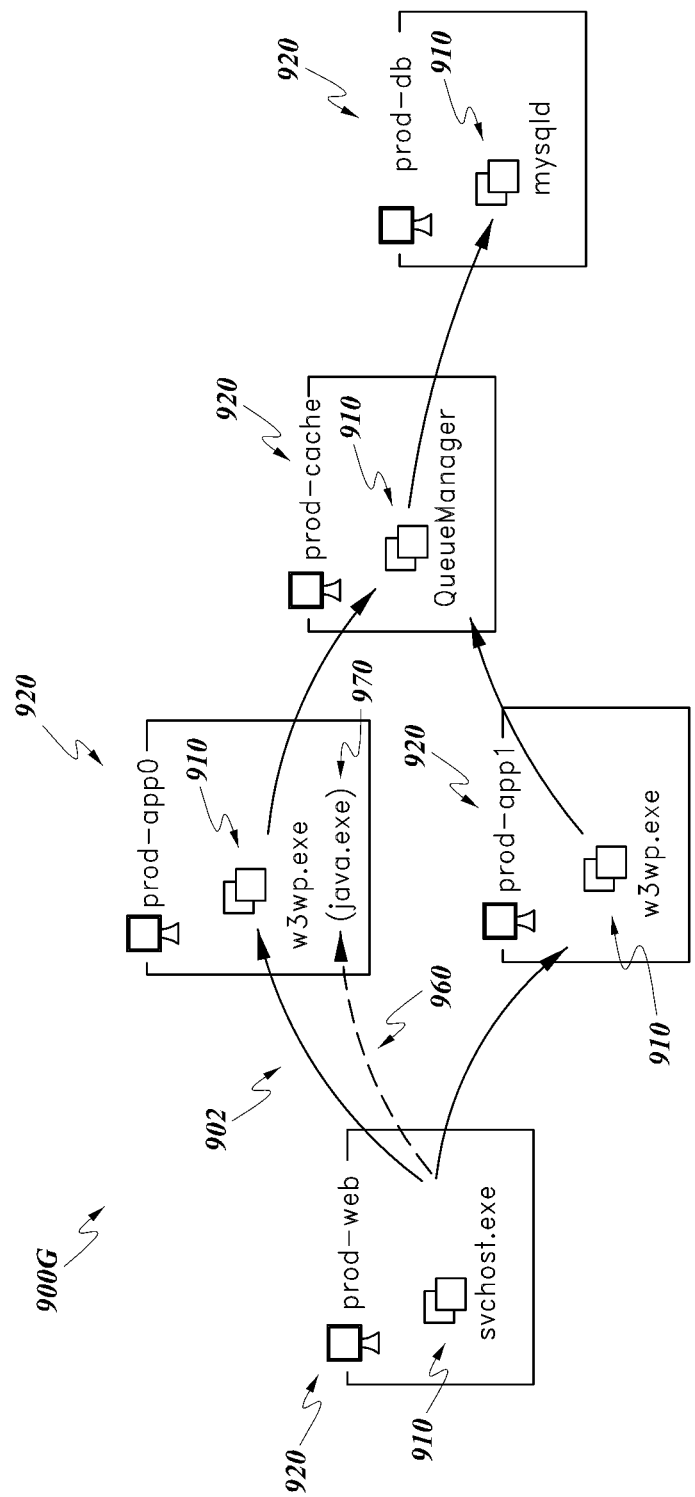

FIG. 9G depicts another example scenario 900G where, like the scenario 900C of FIG. 9C, the processes 910 are shown grouped by their respective hosts 920. The scenario 900G also depicts a comparison between a portion of a current dependency graph and a previous dependency graph. In particular, in addition to the dependencies 902 shown in FIG. 9C, the scenario 900G includes a previous dependency 960 between the process svchost.exe 910 and a java process 970. This previous dependency 960 may have existed in a previous version of the dependency graph. It can be useful to show changes between dependency graph versions to enable systems administrators to better understand how a computing environment is changing over time for troubleshooting purposes or for other purposes.

The dependency 960 is shown in dashed lines in the depicted embodiment to indicate that it is a prior dependency. In other embodiments, the dependency 960 may be shown in a different color from the dependencies 902, such as a grayed-out color or the like. Likewise, the process 970 associated with the previous dependency 960 may be shown grayed out, in a different color, in parentheses (as shown), in strikethrough, combinations of the same, or the like.

In one embodiment, the dependency manager 140 of FIG. 1 saves different versions of dependency graphs in the data store 160. When a user requests to see a comparison between two dependency graphs, the custom filter module 146 can run the same filter on both a current version and a previous version of the dependency graph. The custom filter module 146 can compare nodes and edges in the resulting filtered current and previous dependency graphs to determine which nodes and/or edges have changed. The custom filter module 146 can then output a view of the comparison between the filtered current dependency graph and the filtered previous dependency graph, like the scenario 900G shown. This comparison view can use standard track changes user interface features, such as underline and strikethrough, to depict additions and deletions, as well as any other possible ways to illustrate differences such as the different colors described above.

It should be noted that the rollup and groupBy functions can affect whether or not differences between current and previous dependency graphs are displayed. In FIG. 9G, for instance, the rollup and groupBy settings of the custom filter have shown both processes 910 and hosts 920. In contrast, the scenario 900B of FIG. 9B depicts hosts 920 but not processes 910. If the change to the dependency graph was a change in process, but not host, dependencies as in FIG. 9G, a custom filter view such as the scenario 900B shown in FIG. 9B would depict no changes. In an embodiment, the custom filter module 146 can alert or warn a user that the custom filter view chosen by the user will not depict changes, or that another view of the same current and previous dependency graphs may depict changes.

Although not shown in the examples of FIGS. 9A through 9G, the custom filter module 146 can provide many other features for custom filters. One such example feature is the ability to render the dependency graph differently based on path links, such as network links between monitored resources. Network links can include routers, switches, firewalls, or other network hardware or intermediate hardware that connects components such as hosts, servers, and the like. Network links can also be monitored resources in some embodiments and may be included in the dependency graph by the dependency detector 142 of FIG. 1. However, the custom filter module 146 may provide a path variable or feature that can allow a custom filter to either 1) hide or ignore the path or network links between components, 2) depict path links in detail, or 3) depict a cloud (or other abstraction) such as the cloud 950 of FIG. 9F in place of path links. In other embodiments, the dependency detector 142 excludes network links when building the dependency graph to avoid cluttering the dependency graph.

In some embodiments, the filterMethod function(s) of a custom filter can support Boolean logic, including NOT, AND, OR, or other Boolean operators. The "OR" Boolean operator is implicitly used in some embodiments by chaining multiple filterMethods or filterDefinitions together in one filterChain. Boolean logic can be used, for example, in combination with regular expressions to more easily identify monitored resources to be included in the filter.

The filterMethod function(s) of a custom filter can support a plurality of definitions and features, including custom scripts, type-based filtering, and object-collection based filtering. The filter examples in FIGS. 9A through 9G depict type-based filtering, where filters constructed based on object types (such as processes, hosts, services, etc.). In script-based filtering, the filterMethod can include or can invoke a script that enables objects to be identified, rolled up, and/or grouped together (e.g., with groupBy) based on any property of the objects. As an example, a custom filter can include a script that rolls up hosts that have a certain process running on the hosts, or that groups hosts that run a certain operating system (such as Linux) together like the groupings shown in FIG. 9C. Collection-based filtering can include filtering based on a collection of objects. For example, a custom filter can be constructed by passing in a collection of objects to the custom filter, where the collection of objects comprises a set of objects in a particular data center. In various embodiments, a custom filter can combine scripts, type-based filtering, and collection-based filtering in a single custom filter. Moreover, users can define different ways to apply rollup and groupBy to different kinds of objects within the same custom filter, and the different combinations of scripts, type-based filtering, and collection based filtering can result in very complex custom filters that map different objects to different types of rollups and groupBy operations.

The layer command described above can also specify dependencies to include in a hidden layer, not to be shown. This hidden layer command can allow objects to be easily hidden from display and may be easier than defining the custom filter differently to exclude certain items. For example, a system may include a first group of hosts that run web servers and a second group of hosts that run database servers. A third group of hosts may include both web servers and database servers. A custom filter to depict all web servers while hiding any server that includes a database server may be generated by searching for all hosts that include web servers (which would also return those hosts that have both web and database servers) and hiding those hosts that also have database servers.

VI. Additional Embodiments

Many other embodiments other than those described above can be implemented by the computing management system 110. For instance, in one embodiment, registry variables and/or custom filters may be time-sensitive. The registry module 144 may provide functionality (e.g., via a user interface or scripting interface) that enables users to specify expiration times for registry variables, start and/or stop times for registry variables, or the like. Further, in some embodiments, the registry module 144 can respond to certain inputs to temporarily change a registry variable setting.

One example application for time-sensitive registry settings is maintenance blackout periods. Monitored resources 102 are occasionally taken out of service or offline for maintenance. Maintenance may be scheduled or unplanned. In either scheduled or unplanned maintenance scenarios, objects that represent offline monitored resources 102 can be removed from the dependency model and/or dependency views. For instance, such objects can be tagged with metadata in the dependency model and/or registry indicating that maintenance is occurring on the corresponding monitored resources.

IT personnel may, for instance, access a user interface output by the registry module 144 to tag objects for maintenance. In one embodiment, the registry module 144 enables users to tag an object for maintenance, and the registry module 144 can infer that any child or descendent objects from the tagged object are also tagged for maintenance. The registry module 144 may also provide scheduling functionality that allows users to specify time periods in which an object or set of objects will be tagged for maintenance.

In general, taking components offline (due to planned or unplanned maintenance) can cause the topology model to change. Changes to the topology model can be propagated to the dependency graph, which can then be reflected in dependency views. However, there may be a significant delay between a component going offline and the dependency views being updated, which delay can be mitigated by providing time-sensitive updates to registry settings and/or custom filters.

The registry module 144 may also allow users to define queries that specify sets of objects that will be tagged for maintenance. More generally, the registry module 144 can also allow users to define queries for a variety of registry variable settings. Queries can be used to define relationships, such as parent-child object relationships for dependency purposes. One or more objects that match a query can be defined to be a child or parent of a host object, for instance. Queries can provide for more flexible definitions of parent-child relationships or other registry settings. In some embodiments, queries can be particularly useful to find groups that are related to a particular object but that are unknown to be related to that object, including some scenarios where objects are part of multiple groups or containers. Some monitored resources may have a property that they are associated with a certain group, but this property may be not be stored in the topology model. Accordingly, a query can be executed to identify any group to which the monitored resources belong. Queries can be in structured query language (SQL) format or in another language.

In another embodiment, the dependency detector 142 can detect transient dependencies associated with individual business transactions. A customer purchase of an item in an electronic commerce store, for instance, may involve interactions between several monitored resources, such as a web server, application server, and database server and associated storage devices. The dependency detector 142 can identify a communication from the web server associated with such a transaction and follow subsequent related communications to other monitored resources to identify dependencies to the application server, database server, and data storage devices. In one embodiment, the dependency detector 142 tracks the transaction by associating communications between components that share a unique identifier associated with the transaction. The identity of the user or the purchased product, for instance, may be used throughout the transaction, allowing the dependency detector 142 to identify communications between components as being related. The dependency detector 142 can associate the components involved in the transaction together under a transaction category, similar to a service encapsulating multiple hosts described above. The dashboard user interface module 150 can provide functionality for users to explore dependencies by transactions. Likewise, the custom filter module 146 can provide filters for finding transactions based on product identifiers, user identifiers, or queries for other information to enable the dashboard user interface module 150 to output transactional dependencies.

In another embodiment, the dashboard user interface module 150 may provide a verbose option that allows users to turn off exceptions and/or custom filters to thereby see an entire dependency graph or larger subset thereof. Such views may be useful in some maintenance or planning scenarios.

It should also be noted that although described herein with respect to topology models, the dependency tracking features herein need not be used in conjunction with topology models. Instead, dependencies can be tracked between computing devices without first building topology models in some embodiments.

In still other embodiments, the features of the computing management system 110 can be applied to contexts outside of IT computing environments. For instance, the features of the computing management system 110 can be applied to tracking dependencies between electrical power grid components, including electricity power meters, substations, and so forth. Each electrical component, for instance, can be represented by an object, and data from the objects (such as electricity consumption data from power meters) can be tracked and stored in a central repository. Dependencies between electrical components can be displayed to power company personnel. As another example, the features described herein can be implemented in general programming languages. Registries and custom filters, for instance, can allow object-oriented programming parent/child relationships to be redefined at runtime can be implemented.

In some embodiments, registry variables can be considered to be global variables that are override certain type definitions in the topology model and/or dependency graph. These type definitions can include parentage definitions, for example, as described above. Further, custom filters can override registry variables for some or all of the topology model and/or dependency graph. For instance, while a registry variable may define a new parent of an object not already included in the topology model or dependency graph, the custom filter can ignore this parent definition entirely. Registry variables can therefore be useful for global changes to the topology model/dependency graph while custom filters can be useful for local custom view of a portion of the topology model/dependency graph. Custom filters can also be used to view the global topology model/dependency graph in some embodiments.

In many embodiments described herein, a dependency graph is filtered to obtain a dependency view that is output for presentation to a user. However, any of the embodiments described herein can be modified to perform actions with a filtered dependency graph other than (or in addition to) displaying the filtered dependency graph. For instance, in one embodiment a filtered dependency graph can be provided to a performance monitoring process that analyzes the filtered dependency graph. The performance monitoring process may send an alarm to a user if a dependency in the filtered dependency graph has changed (e.g., without permission). The custom filter module 146 can provide data representing a comparison between a previous and current dependency graph view, as described above, to enable the performance monitoring process to detect the change. In another embodiment, filtered dependency data (or a previous/current comparison of such data) can be used to update service membership of one or more services. If a filtered dependency graph includes changes, a service definition can be changed to reflect those changes. In yet another embodiment, filtered dependency data can be used for capacity planning purposes. Changes in filtered dependency data over time can reflect whether a computing infrastructure is growing and therefore may need additional storage capacity and/or processing resources in the future (e.g., soon).

VII. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

Some or all of the features described herein are sufficiently mathematically or technically complex that one or more computing devices may be necessary to carry them out. Thus, for example, the various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of providing information about dependencies in a computing environment to a user, the method comprising:
    receiving monitoring data obtained from a plurality of monitored resources in a computing environment;
    transforming the monitoring data into a topology model comprising a plurality of interconnected topology objects, the topology objects representing the monitored resources, wherein interconnections between the topology objects reflect existing relationships between the plurality of monitored resources in the computing environment;
    tracking first dependencies between first ones of the topology objects based at least in part on observed interactions between the first topology objects, the observed interactions between the first topology objects being at least partially different from the existing relationships represented in the topology model;
    inferring second dependencies between second ones of the topology objects based at least in part on the observed interactions between the first topology objects and the interconnections between the topology objects represented in the topology model;
    storing data representing the first and second dependencies in a dependency graph;
    providing a registry user interface configured to enable users to annotate the dependency graph to adjust the first and second dependencies represented in the dependency graph to thereby produce a modified dependency graph;
    applying, with a computer system comprising computer hardware, one or more custom filters to the modified dependency graph to select a custom view of the second dependencies in the modified dependency graph for display, the applying comprising:
        receiving a user selection of an object in the topology model;
        identifying the object in the dependency graph; and
        transitively searching the dependency graph for a next node so as to identify dependencies of the object, wherein the computer system skips each said next node in the dependency graph that is subject to the one or more custom filters; and
    outputting the custom view of the second dependencies for presentation to a user.

2. The method of claim 1, wherein said outputting the custom view of the second dependencies for presentation to the user comprises outputting the second dependencies in a graph or table.

3. The method of claim 1, wherein the one or more custom filters are further configured to select the custom view of the second dependencies comprising those of the second dependencies related to hardware components of the plurality of monitored resources.

4. The method of claim 1, wherein the one or more custom filters are further configured to select the custom view of the second dependencies comprising those of the second dependencies related to virtual components of the plurality of monitored resources.

5. The method of claim 4, wherein the registry user interface is further configured to enable users to cause selected ones of the first topology objects to not be provided in the custom view of the second dependencies due to the selected first topology objects being subject to maintenance.

6. A system for providing information about dependencies in a computing environment to a user, the system comprising:
    a topology engine configured to transform monitoring data received from a plurality of computing devices into a topology model comprising a plurality of interconnected topology objects, such that interconnections between the topology objects reflect existing relationships between the plurality of computing devices;
    a dependency detector configured to build a dependency graph by inferring dependencies between first ones of the topology objects based at least in part on observed interactions between second ones of the topology objects and the interconnections between the topology objects represented in the topology model; and
    a custom filter module comprising computer hardware, the custom filter module configured to:
        provide functionality for defining a custom filter for filtering the dependency graph;
        apply, in response to a user request to view dependencies, the custom filter to the dependency graph to select a subset of the dependencies in the dependency graph, the application of the custom filter comprising:
            receipt of a user selection of an object in the topology model;
            identification of the object in the dependency graph; and
            a transitive searching of the dependency graph for a next node so as to identify dependencies of the object, wherein the custom filter module skips each said next node in the dependency graph that is subject to the custom filter; and
        provide the subset of dependencies as an output; and
    wherein the custom filter is configured to ignore selected ones of the dependencies in the dependency graph when selecting the subset of the dependencies.

7. The system of claim 6, further comprising a dashboard user interface module configured to output the subset of the dependencies for presentation to the user in the form of a graph or a table.

8. The system of claim 6, wherein the custom filter is further configured to ignore selected ones of the dependencies in the dependency graph when selecting the subset of the dependencies in the dependency graph.

9. The system of claim 6, wherein the custom filter is configured to select those of the dependencies related to hardware components of the computing devices.

10. The system of claim 9, wherein the custom filter module is further configured to provide functionality for defining a second custom filter configured to select those of the dependencies related to virtual components of the computing devices.

11. The system of claim 6, further comprising a registry module configured to provide registry variables that enable users to modify the dependency graph to adjust the dependencies represented in the dependency graph to thereby produce a modified dependency graph.

12. The system of claim 11, wherein the dependency graph comprises a tree data structure configured to link the first topology objects in parent-child relationships, and wherein the registry module is further configured to provide functionality that enables users to adjust the parent-child relationships.

13. The system of claim 11, wherein the registry module is further configured to provide functionality for causing selected ones of the first topology objects to not be provided in the output of the subset of dependencies due to the selected first topology objects being subject to maintenance.

14. The system of claim 11, wherein the custom filter of the custom filter module is further configured to override one or more of the registry variables.

15. The system of claim 6, further comprising a dashboard user interface module configured to output the subset of dependencies.

16. The system of claim 6, wherein the custom filter comprises a rollup filter condition configured to return those of the topology objects that have direct or inferred dependencies at a specified level of the dependency graph.

17. The system of claim 6, wherein the custom filter comprises a group by condition that groups the topology objects in the subset of the dependency graph together based on a shared property of the topology objects in the subset of the dependency graph.

18. Non-transitory physical computer storage comprising instructions stored thereon that, when executed by one or more processors, implement components for providing information about dependencies in a computing environment to a user, the components comprising:

a dependency detector configured to build a dependency graph from dependencies detected between computing devices in a computing environment;

a registry module configured to provide functionality that enables users to modify the dependency graph to adjust the dependencies represented in the dependency graph to thereby produce a modified dependency graph;

a plurality of custom filters, wherein each custom filter is configured to:
  receive a user selection of an object in the topology model;
  identify the object in the dependency graph; and
  transitively search the dependency graph for a next node so as to identify dependencies of the object, wherein the custom filter skips each said next node in the dependency graph that is subject to the custom filter; and
  provide the subset of dependencies as an output; and wherein the plurality of custom filters are further configured to ignore selected ones of the dependencies in the dependency graph when selecting the subset of the dependencies.

19. The non-transitory physical computer storage of claim 18, wherein the dependency graph comprises objects arranged in a hierarchical data structure, the objects representing the computing devices.

20. The non-transitory physical computer storage of claim 19, wherein the registry module is further configured to enable users to modify relationships between the objects in the hierarchical data structure.

21. The non-transitory physical computer storage of claim 20, wherein the registry module is further configured to enable users to perform one or more of the following:
  add additional relationships between objects, ignore relationships between objects, and delete relationships between objects.

22. The non-transitory physical computer storage of claim 18, wherein the custom filters comprise first and second custom filters, the first custom filter configured to select a first subset of the dependencies related to a first aspect of the computing environment, the second custom filter configured to select a second subset of the dependencies related to a second aspect of the computing environment.

23. The non-transitory physical computer storage of claim 18, wherein the registry module is further configured to provide functionality for causing selected ones of the computing devices to not be represented in the output of the subset of dependencies due to the selected computing devices being subject to maintenance.

24. The non-transitory physical computer storage of claim 18, wherein the components further comprise a dashboard user interface module configured to output the subset of dependencies.

* * * * *